US012719291B2

(12) United States Patent
Zhu et al.

(10) Patent No.: US 12,719,291 B2
(45) Date of Patent: Aug. 25, 2026

(54) JUMP START CIRCUIT, JUMP STARTER AND JUMP START DEVICE

(71) Applicant: Dong Guan Carosstech Co., Ltd, Dongguan (CN)

(72) Inventors: Chunyi Zhu, Loudi (CN); Ziyuan Liu, Dongguan (CN)

(73) Assignee: Dong Guan Carosstech Co., Ltd, Dongguan (CN)

( * ) Notice: Subject to any disclaimer, the term of this patent is extended or adjusted under 35 U.S.C. 154(b) by 0 days.

(21) Appl. No.: 19/344,551

(22) Filed: Sep. 30, 2025

(65) Prior Publication Data

US 2026/0106463 A1 Apr. 16, 2026

(30) Foreign Application Priority Data

Oct. 10, 2024 (CN) ......................... 202411412066.1
Oct. 31, 2024 (CN) ......................... 202411546936.4
Jul. 9, 2025 (CN) ......................... 202510947932.5

(51) Int. Cl.
*H02J 7/34* (2006.01)
*H02J 7/60* (2026.01)
(Continued)

(52) U.S. Cl.
CPC .............. *H02J 7/342* (2020.01); *H02J 7/663* (2026.01); *H02J 7/685* (2026.01); *H02J 7/751* (2026.01); *H02J 7/92* (2026.01)

(58) Field of Classification Search
CPC ........ H02J 7/342; H02J 7/0031; H02J 7/0036; H02J 7/0045; H02J 7/0071
See application file for complete search history.

(56) References Cited

U.S. PATENT DOCUMENTS

2015/0329008 A1* 11/2015 Karlson .............. H01M 10/425 320/134
2022/0045505 A1* 2/2022 Zhu ...................... H02H 1/0007
(Continued)

FOREIGN PATENT DOCUMENTS

CN 208782540 U 4/2019
CN 109995103 A 7/2019
(Continued)

OTHER PUBLICATIONS

Electronic Tutorials, 555 Circuits Part 1, 2023, pp. 2-4 (Year: 2023).*
(Continued)

*Primary Examiner* — Julian D Huffman
*Assistant Examiner* — John P Ondrasik

(57) ABSTRACT

The present disclosure provides a jump start circuit, a jump starter and a jump start device. The jump start circuit includes: a switch module and a voltage fluctuation detection module. The jump start circuit further has a first input terminal, a second input terminal, a first output and a second output. The voltage fluctuation detection module is configured to electrically connect to at least one of the first input terminal, the first output and the branches between the first input terminal and the first output at a connection point, and voltage fluctuation detection module is configured to detect the electric potential fluctuation at the connection point. When the detected electric potential fluctuation reaches the fluctuation threshold, the voltage fluctuation detection module outputs a starting identification signal. Under a triggering of the starting identification signal, the switch module remains in an ON state.

20 Claims, 16 Drawing Sheets

(51) Int. Cl.

| | |
|---|---|
| ***H02J 7/70*** | (2026.01) |
| ***H02J 7/92*** | (2026.01) |

(56) References Cited

U.S. PATENT DOCUMENTS

| | | | | |
|---|---|---|---|---|
| 2022/0077681 | A1* | 3/2022 | Lei | H02J 7/0047 |
| 2022/0158462 | A1* | 5/2022 | Lei | H02J 7/0045 |
| 2023/0057431 | A1* | 2/2023 | Nook | H02J 7/0031 |
| 2025/0023345 | A1* | 1/2025 | Liao | H02J 1/122 |

FOREIGN PATENT DOCUMENTS

| | | |
|---|---|---|
| CN | 217087774 U | 7/2022 |
| CN | 118017645 A | 5/2024 |

OTHER PUBLICATIONS

International Search Report Issued on Nov. 21, 2025 for Corresponding PCT Application No. PCT/CN2025/126177.

Written Opinion of the International Searching Authority Issued on Nov. 21, 2025 for Corresponding PCT Application No. PCT/CN2025/126177.

* cited by examiner

JUMP START CIRCUIT, JUMP STARTER AND JUMP START DEVICE

CROSS-REFERENCE TO RELATED APPLICATIONS

The present disclosure claims priority of Chinese Patent Application No. 202411412066.1, filed on Oct. 10, 2024, Chinese Patent Application No. 202411546936.4, filed on Oct. 31, 2024, Chinese Patent Application No. 202510947932.5, filed on Jul. 9, 2025, the entire contents of which are hereby incorporated by reference.

TECHNICAL FIELD

The present disclosure relates to the field of jump start technology, in particular relates to a jump start circuit, a jump starter and a jump start device.

BACKGROUND

When output capacity of the automobile battery cannot meet ignition requirements, the automobile needs to be started with the help of an additional starting power supply. The starting power supply is connected to the automobile battery via an ignition clamp to charge the automobile battery, or directly provide electric power needed to start the automobile.

The ignition clamp includes a first clamp and a second clamp. When the starting voltage of the starting power supply is applied to the first clamp and the second clamp, if the first clamp and the second clamp are removed from the positive electrode and the negative electrode of the automobile battery, there is a risk of short-circuiting contacts between the first clamp and the second clamp.

In an enabled state of the ignition clamp or the starting power supply, a number of detection periods spaced in time intervals are set. In the detection periods, the transmission between the starting voltage and the first clamp or the second clamp is firstly interrupted by a switch element, and then a voltage between the first clamp and the second clamp is detected. When the voltage between the first clamp and the second clamp is close to zero, then it is determined that the first clamp or the second clamp has been removed from the automobile battery, and the ignition clamp or the starting power supply needs to end the enabled state and enter a standby state, so that the starting voltage is no longer applied between the first clamp and the second clamp.

When users perform ignition operation on the automobile, the electrical load such as the automobile starter needs to input a large current in a short period of time. However, when a detection period occurs during the ignition operation, since the current input to the electrical load is stopped during the detection period, it results in a decrease in the average input power of the electrical load, which may cause ignition failure. In addition, since the switch element switches to the disconnected state when a large current passes through it, the loss of the switch element is large, shortening a service life of the switch element.

SUMMARY

Based on this, the present disclosure provides a jump start circuit, a jump starter and a jump start device that can solve or at least alleviate the above technical problems.

The present disclosure provides a jump start circuit, configured to operably connect a starting power supply to a load battery, including:

a first input and a second input, configured to electrically connect to a first electrode and a second electrode of the starting power supply respectively;

a first output and a second output, configured to electrically connect to a first electrode and a second electrode of the load battery respectively;

a switch module, electrically connected between the first input terminal and the first output, configured to operably connect the first input terminal to the first output; and a voltage fluctuation detection module, electrically connected to at least one of the first input terminal, the first output and the branches between the first input terminal and the first output at a connection point, the voltage fluctuation detection module configured to detect an electric potential fluctuation at a connection point, when the detected electric potential fluctuation reaches a fluctuation threshold, the voltage fluctuation detection module outputs a starting identification signal; under a triggering of the starting identification signal, the switch module remains in an ON state.

In the above emergency start circuit, when an ignition operation occurs, the electrical load is powered on. Since the electrical load is electrically connected between the first electrode and the second electrode of the load battery, the resistance of the electrical load is relatively lower than the internal resistance of the starting power supply and the resistance of the load battery, so that the actual voltage at the first input terminal, the first output, and any point of the branches between the first input terminal and the first output has a certain electric potential drop fluctuation relative to the voltage level before the ignition operation. When it is detected that the electric potential drop fluctuation reaches a fluctuation threshold, the voltage fluctuation detection module outputs a starting identification signal. After the starting identification signal is generated, the switch module directly or indirectly prioritizes to respond to the starting identification signal, and maintains the ON state, thereby preventing the switch module from being affected by other modules and switching to the OFF state during the ignition operation, which is beneficial to provide sufficient input power to the electrical load and ensuring the success rate of ignition. At the same time, it prevents the switch module from switching ON and OFF when a large current passes through it, reduces the component loss in the switch module, and facilitates to extend the service life of the switch module.

In one embodiment, it further includes an access detection module, configured to output a connection confirmation signal when detecting that the first output and the second output are correctly connected to the first electrode and the second electrode of the load battery respectively; when the connection confirmation signal is received and the electric potential fluctuation is detected to reach the fluctuation threshold, the voltage fluctuation detection module outputs the starting identification signal.

In one embodiment, it further includes a first switch control module; the first switch control module is electrically connected between the voltage fluctuation detection module and the switch module; the first switch control module controls a state of the switch module at least based on the starting identification signal.

In one embodiment, when the connection confirmation signal is received but the starting identification signal is not received, the first switch control module alternately timings a power-on period and a detection period in time, and the first switch control module triggers the switch module to switch to the ON state during the power-on period and triggers the switch module to switch to an OFF state during the detection period; when the connection confirmation signal and the starting identification signal are both received, the first switch control module controls the switch module to remain in the ON state.

In one embodiment, the first switch control module includes a timing management chip U4; the timing management chip U4 is provided with a first level locking terminal, a second level locking terminal and an output terminal; the first level locking terminal and the second level locking terminal are electrically connected to the voltage fluctuation detection module to receive the starting identification signal; when the starting identification signal is received, the output terminal continuously outputs a valid level to the switch module, and the valid level is configured to trigger the switch module to switch to the ON state.

In one embodiment, the voltage fluctuation detection module includes a fluctuation detection unit and an access coupling unit electrically connected to the fluctuation detection unit; the fluctuation detection unit is electrically connected to at least one of the first input terminal and the first output; when the detected electric potential fluctuation reaches the fluctuation threshold, the fluctuation detection unit outputs an ignition detection signal to the access coupling unit; when the ignition detection signal and the connection confirmation signal are received, the access coupling unit outputs the starting identification signal.

In one embodiment, the fluctuation detection unit includes a switch element Q11, a diode D4, a capacitor C23 and a fluctuation current limiting branch; an anode of the diode D4 is electrically connected to the first input terminal or the first output; the capacitor C23 is electrically connected between an cathode of the diode D4 and a ground; the cathode of the diode D4 is further electrically connected to one current-passing end of the switch element Q11; one end of the fluctuation current limiting branch is electrically connected to a control end of the switch element Q11, and an other end is electrically connected to the first input terminal or the first output; an other current-passing end of the switch element Q11 is configured to output the ignition detection signal to the access coupling unit.

In one embodiment, the fluctuation current limiting branch includes a resistor R87, an end of the resistor R87 is electrically connected to the control end of the switch element Q11, and an other end is electrically connected to the first input terminal or the first output; or, the fluctuation current limiting branch includes a resistor R87 and a diode D6 connected in series, and an unidirectional conduction direction of the diode D6 corresponds to a current outflow direction from the control end of the switch element Q11.

In one embodiment, the fluctuation detection unit further includes a resistor R15, and the resistor R15 is electrically connected between the other current-passing end of the switch element Q11 and the access coupling unit.

In one embodiment, the access coupling unit includes a switch element Q9, a switch element Q14, a switch element Q23, a resistor R7 and a first voltage divider branch; a current-passing end of the switch element Q9 is configured to receive the connection confirmation signal; the resistor R7 is electrically connected between the current-passing end of the switch element Q9 and a control end of the switch element Q9; a current-passing end of the switch element Q14 is electrically connected to the control end of the switch element Q9, and an other current-passing end is grounded; a control end of the switch element Q14 is configured to receive the ignition detection signal; the first voltage divider branch is electrically connected between an other current-passing end of the switch element Q9 and the ground; a middle node of the first voltage divider branch is electrically connected to a control end of the switch element Q23; a current-passing end of the switch element Q23 is configured to output the starting identification signal, and an other current-passing end is grounded.

In one embodiment, the access detection module includes a first access detection module, the first access detection module is configured to detect a voltage of the first output; when the voltage of the first output is greater than a first voltage threshold, the first access detection module outputs the connection confirmation signal.

In one embodiment, the access detection module includes a second access detection module, the second access detection module is configured to output a detection voltage to the first output, and the detection voltage decreases as a resistance value between the first output and the second output decreases; when the detection voltage is less than a second voltage threshold, at least one of the second access detection module and the first access detection module outputs the connection confirmation signal.

In one embodiment, it further includes a second switch control module electrically connected to the switch module; after receiving the connection confirmation signal, the second switch control module starts to enable timing; under the triggering of the starting identification signal, the switch module remains in the ON state until the starting identification signal is eliminated or a time period defined by the enabled timing ends.

In one embodiment, the voltage fluctuation detection module is electrically connected to the switch module; when receiving the starting identification signal, the switch module remains in the ON state.

The present disclosure further provides a jump starter, configured to operably connect a starting power supply to a load battery, comprising:

- a housing, and
- a jump start circuit according to any one of above embodiments, wherein the jump start circuit is mounted in the housing, and the starting power supply is arranged outside the housing.

In one embodiment, the first output and the second output are both constructed as clamps arranged outside the housing.

The present disclosure further provides a jump start device, comprising:

- a housing;
- a starting power supply, accommodated in the housing; and
- a jump start circuit according to any one of above embodiments, wherein the jump start circuit is mounted in the housing.

Figure 1A:
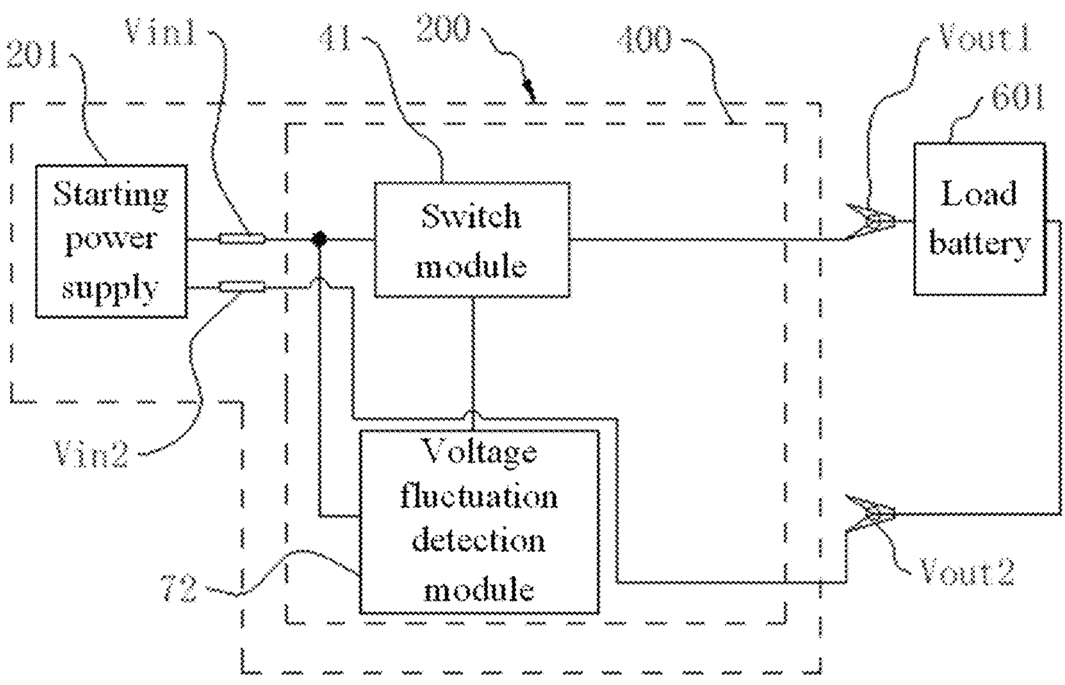
FIG. 1*a* is a schematic diagram of the circuit principle of a jump start device according to an embodiment of the present disclosure.

Reference numerals: 200: jump start device; 201: starting power supply; 202: housing; 203: connector; 300: jump starter; 400: jump start circuit; Vin1: first input terminal; Vin2: second input terminal; Vout1: first output; Vout2: second output; 41: switch module; 411: switch driving unit; 42: sound alarm module; 43: light indication module; 44: voltage detection module; 45: temperature detection module; 46: first switch control module; 47: first access detection module; 471: access driving unit; 472: anti-short circuit unit; 48: second switch control module; 49: voltage stabilizing module; 71: second access detection module; 711: first determining unit; 72: voltage fluctuation detection module; 721: fluctuation detection unit; 722: access coupling unit; 73: forced starting module; 731: control unit; 732: delay voltage divider unit; 733: locking unit; 74: anti-reverse connection module; 81: overload detection module; 811: second determining unit; 812: output unit; 601: load battery; 602: electrical load.

DESCRIPTION OF EMBODIMENTS

The technical solution of the present disclosure will be described clearly and completely below in conjunction with the accompanying drawings. Obviously, the described embodiments are part of the embodiments of the present disclosure, rather than all of the embodiments. Based on the embodiments in the present disclosure, all other embodiments obtained by the skilled persons in the art without creative work are within the scope of protection of the present disclosure.

In the description of the present disclosure, it should be noted that the terms "center", "upper", "lower", "left", "right", "vertical", "horizontal", "inner", "outer", etc., indicating the orientation or positional relationship, are based on the orientation or positional relationship shown in the drawings, and are only for the convenience of describing the present disclosure and simplifying the description, rather than indicating or implying that the device or element referred to must have a specific orientation, be constructed and operated in a specific orientation, and therefore cannot be understood as limiting the present disclosure. In addition, the terms "first", "second", and "third" are used for descriptive purposes only, and cannot be understood as indicating or implying relative importance.

In the description of the present disclosure, it should be noted that, unless otherwise clearly specified and limited, the terms "installed", "coupled", and "connected" should be understood in a broad sense, for example, it can be a fixed connection, a detachable connection, an integral connection, a mechanical connection, an electrical connection, a direct connection, an indirect connection through an intermediate medium, or the internal connection of two components. For the skilled persons in the art, the specific meanings of the above terms in the present disclosure can be understood according to specific circumstances.

The technical solution provided by the embodiment of the present disclosure is described below in conjunction with the accompanying drawings.

In combination with FIG. 1*a*, the present disclosure provides a jump start device 200. The jump start device 200 includes a starting power supply 201 and a jump start circuit 400 electrically connected to the starting power supply 201. The jump start circuit 400 is configured to operably connect the starting power supply 201 to a load battery 601.

Understandably, the starting power supply 201 can output electric energy to the load battery 601 through the jump start circuit 400, and the jump start circuit 400 can control the ON/OFF (i.e., connected/disconnected, or turned-on/turned-off) state of the circuits between the starting power supply 201 and the load battery 601.

Understandably, the starting power supply 201 is a device capable of outputting a DC voltage. Optionally, the starting power supply 201 can be charged and discharged. For example, the starting power supply 201 is a storage battery, a storage capacitor or other energy storage devices. Exemplarily, the starting power supply 201 is provided with a first electrode and a second electrode. Exemplarily, the first electrode of the starting power supply 201 is a positive electrode, and the second electrode of the starting power supply 201 is a negative electrode.

Understandably, the starting power supply 201 provides a charging voltage to the load battery 601 through the jump start circuit 400. Specifically, the load battery 601 is provided with a first electrode and a second electrode. For example, the load battery 601 is an automobile battery. Exemplarily, the first electrode of the load battery 601 is a positive electrode, and the second electrode of the load battery 601 is a negative electrode. Exemplarily, the negative electrode of the starting power supply 201 and the negative electrode of the load battery 601 are connected to ground respectively.

Specifically, the load battery 601 is connected in parallel with an electrical load 602, and the jump start device 200 is further configured to provide working current to the electrical load 602. The electrical load 602 is electrically connected between the first electrode and the second electrode of the load battery 601.

For example, the electrical load 602 includes an automobile starter, and the automobile starter is configured to drive a crankshaft of the engine to rotate until the crankshaft of the engine reaches a sufficient speed to run on its own. It can be understood that the jump start device 200 provides working current to the electrical load 602, thereby helping to ensure that the automobile completes the starting ignition.

Figure 1B:
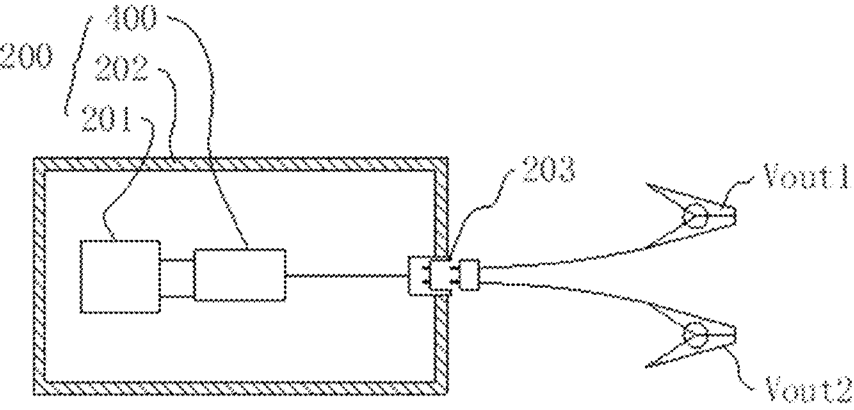
FIG. 1*b* is a schematic diagram of the structure of the jump start device shown in FIG. 1*a*.

In some embodiments, as shown in FIG. 1*b*, the jump start device 200 further includes a housing 202. Optionally, the starting power supply 201 is accommodated in the housing 202. Optionally, the jump start circuit 400 is completely or partly mounted in the housing 202. Optionally, the starting power supply 201 and the jump start circuit 400 are packaged in the same housing 202.

Figure 4A:
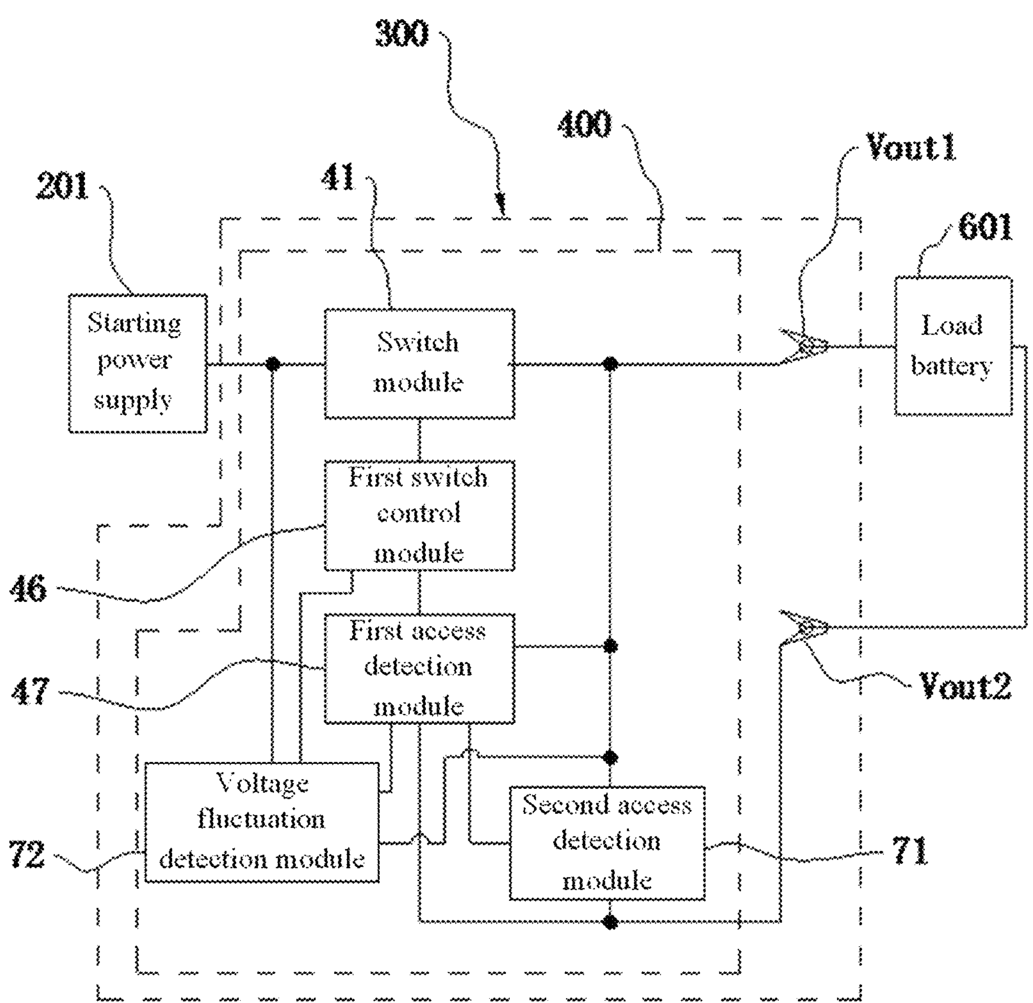
FIG. 4*a* is a schematic diagram of the circuit principle of a jump starter according to an embodiment of the present disclosure.
Figure 4B:
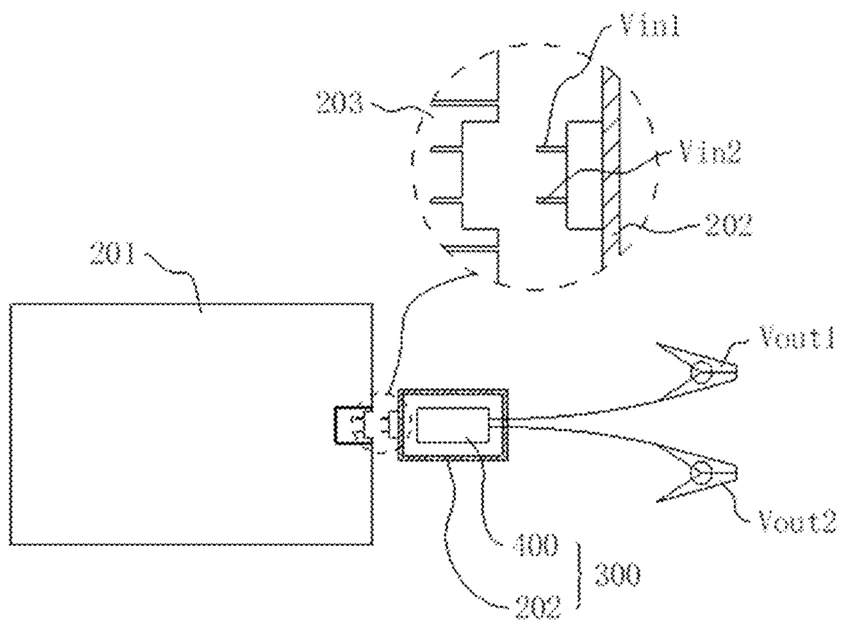
FIG. 4*b* is a schematic diagram of the structure of the jump starter shown in FIG. 4*a*.

As shown in FIG. 4*a* and FIG. 4*b*, the present disclosure further provides a jump starter 300. The jump starter 300 includes a housing 202 and a jump start circuit 400. The jump starter 300 is configured to operably connect an external starting power supply 201 to the load battery 601. The starting power supply 201 outputs electric energy to the load battery 601 through the jump starter 300. It can be understood that the jump starter 300 can control the ON/OFF of the circuits between the starting power supply 201 and the load battery 601. In this embodiment, the jump starter 300 is mechanically and electrically connected to the external starting power supply 201 through a plug-in connector 203.

In combination with FIG. 1*a* and FIG. 4*a*, the present disclosure further provides a jump start circuit 400, which can at least be applied to the above-mentioned jump start device 200 or the jump starter 300.

Specifically, the jump start circuit 400 includes: a switch module 41 and a voltage fluctuation detection module 72. The jump start circuit 400 is further provided with a first input terminal Vin1, a second input terminal Vin2, a first output Vout1 and a second output Vout2. The first input terminal Vin1 and the second input terminal Vin2 are configured to electrically connect to the first electrode and the second electrode of the starting power supply 201, respectively. The first output Vout1 and the second output Vout2 are configured to electrically connect to the first electrode and the second electrode of the load battery 601, respectively. The switch module 41 is electrically connected between the first input terminal Vin1 and the first output Vout1 and is configured to operably electrically connect the first input terminal Vin1 and the first output Vout1. The voltage fluctuation detection module 72 is configured to electrically connect to at least one of the first input terminal Vin1, the first output Vout1, and the branches between the first input terminal Vin1 and the first output Vout1 at a connection point. The voltage fluctuation detection module is configured to detect the electric potential fluctuation at its connection point. When the detected electric potential fluctuation reaches a fluctuation threshold, the voltage fluctuation detection module 72 outputs a starting identification signal. Under the triggering of the starting identification signal, the switch module 41 remains in the ON (i.e. connected or turned-on) state.

In the jump start circuit 400 of the present disclosure, when the first input terminal Vin1 and the second input terminal Vin2 are respectively electrically connected to the first electrode and the second electrode of the starting power supply 201 and the first output Vout1 and the second output Vout2 are respectively electrically connected to the first electrode and the second electrode of the load battery 601, the starting power supply 201, the load battery 601 and the switch module 41 are in an electrical loop, and the switch module 41 controls the ON/OFF of the electrical loop. It can be understood that the switch module 41 has an ON state and an OFF state.

Understandably, in the case of no ignition operation occurs, the voltage of the first input terminal Vin1 or the voltage of the first output Vout1 is in a relatively stable state. When the switch module 41 is in the ON state, the voltage of the first input terminal Vin1 is equal to the voltage of the first output Vout1.

In the case of an ignition operation occurs, the electrical load 602 is powered on. Since the electrical load 602 is electrically connected between the first electrode and the second electrode of the load battery 601, the resistance of the electrical load 602 is relatively lower than the internal resistance of the starting power supply 201 and the resistance of the load battery 601, so that the actual voltage of the first input terminal Vin1, the first output Vout1, and any point of the branches between the first input terminal Vin1 and the first output Vout1 has a certain electric potential drop fluctuation relative to the voltage level before the ignition operation. When it is detected that the electric potential drop fluctuation reaches the fluctuation threshold, the voltage fluctuation detection module 72 outputs a starting identification signal. After the starting identification signal is generated, the switch module 41 directly or indirectly prioritizes the response to the starting identification signal and maintains the ON state, thereby preventing the switch module 41 from being affected by other modules and switching to the OFF state during the ignition operation, which is beneficial for providing sufficient input power to the electrical load 602 and ensuring the success rate of ignition. At the same time, it prevents the switch module 41 from switching ON and OFF when a large current passes through it, reduces the component loss in the switch module 41, and is beneficial for extending the service life of the switch module 41.

In some embodiments, the jump start circuit 400 is mounted in the housing 202 of the jump start device 200.

Optionally, the starting power supply 201 is accommodated in the housing 202 of the jump start device 200.

In some embodiments, the jump start circuit 400 is mounted in the housing 202 of the jump starter 300. The starting power supply 201 is disposed outside the housing 202 of the jump starter 300. The jump start circuit 400 is mounted in the housing 202. Exemplarily, the switch module 41 and the voltage fluctuation detection module 72 of the jump start circuit 400 are disposed inside the housing 202 of the jump starter 300.

In some embodiments, when the jump start circuit 400 is applied to the jump starter 300, the first output Vout1 and the second output Vout2 are both constructed as clamps, which are arranged outside the housing. Understandably, the first output Vout1 and the second output Vout2 adopt a structure in the form of a clamp, which can be clamped on the first electrode and the second electrode of the load battery 601 respectively. In some embodiments, the clamps are mechanically connected to the housing and electrically connected to the jump start circuit 400 through cables. Preferably, the cables are connected to the housing via a connector 203, for example, plug-in connector.

In some other embodiments, the first output Vout1 and the second output Vout2 can adopt a ring-shaped structure. The screw passes through the first output Vout1 or the second output Vout2 and is threadedly connected with the first electrode or the second electrode of the load battery 601, so that the first output Vout1 and the first electrode or the second output Vout2 and the second electrode are fixedly connected. In some other embodiments, the first output Vout1 and the second output Vout2 can also adopt a pluggable structure and are connected to the first electrode or the second electrode of the load battery 601 by plugging.

Exemplarily, the branch between the first input terminal Vin1 and the first output Vout1 at least includes a switch module 41. Optionally, the connection point of the voltage fluctuation detection module can be any end of the switch module 41. Optionally, the connection point of the voltage fluctuation detection module is set on a conductor between one end of the switch module 41 and the first input terminal Vin1. Optionally, the connection point of the voltage fluctuation detection module is set on a conductor between the other end of the switch module 41 and the first output Vout1.

Figure 3:
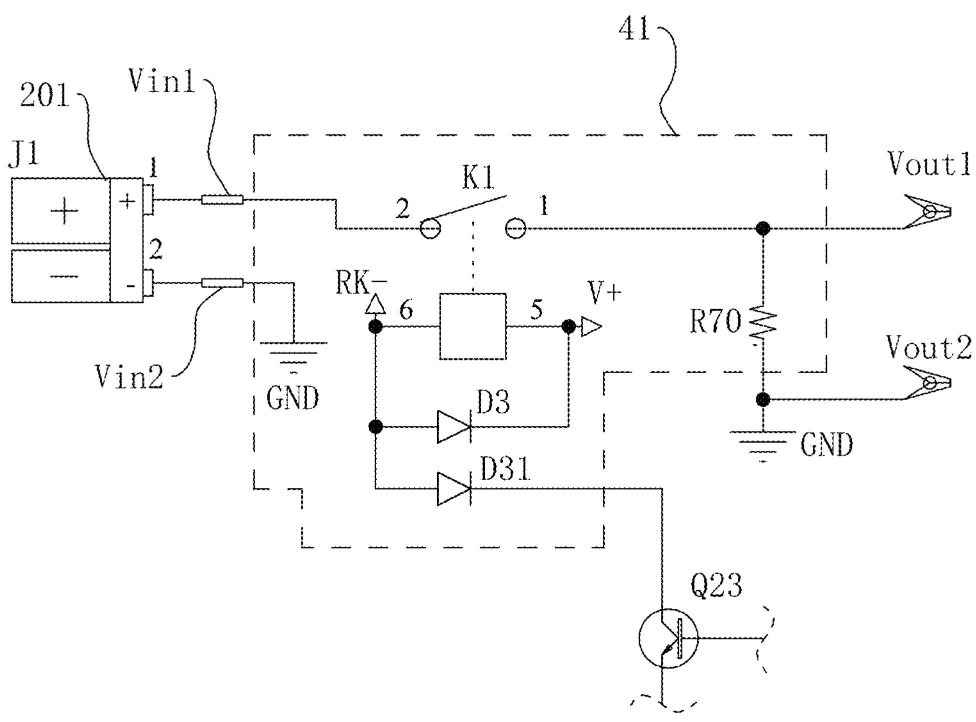
FIG. 3 is a schematic diagram of the circuit structure of a switch module according to an embodiment of the present disclosure.

In some embodiments, as shown in FIG. 1*a* and FIG. 3, the voltage fluctuation detection module 72 is electrically connected to the switch module 41. When receiving the starting identification signal, the switch module 41 remains in the ON state. It can be understood that the starting identification signal can be directly transmitted to the switch module 41, and the starting identification signal directly triggers the switch module 41.

In some other embodiments, the switch module 41 can also be electrically connected between the second input terminal Vin2 and the second output Vout2. Understandably, the switch module 41 can operably connect the second input terminal Vin2 and the second output Vout2.

Understandably, the second output Vout2 is grounded.

Figure 6:
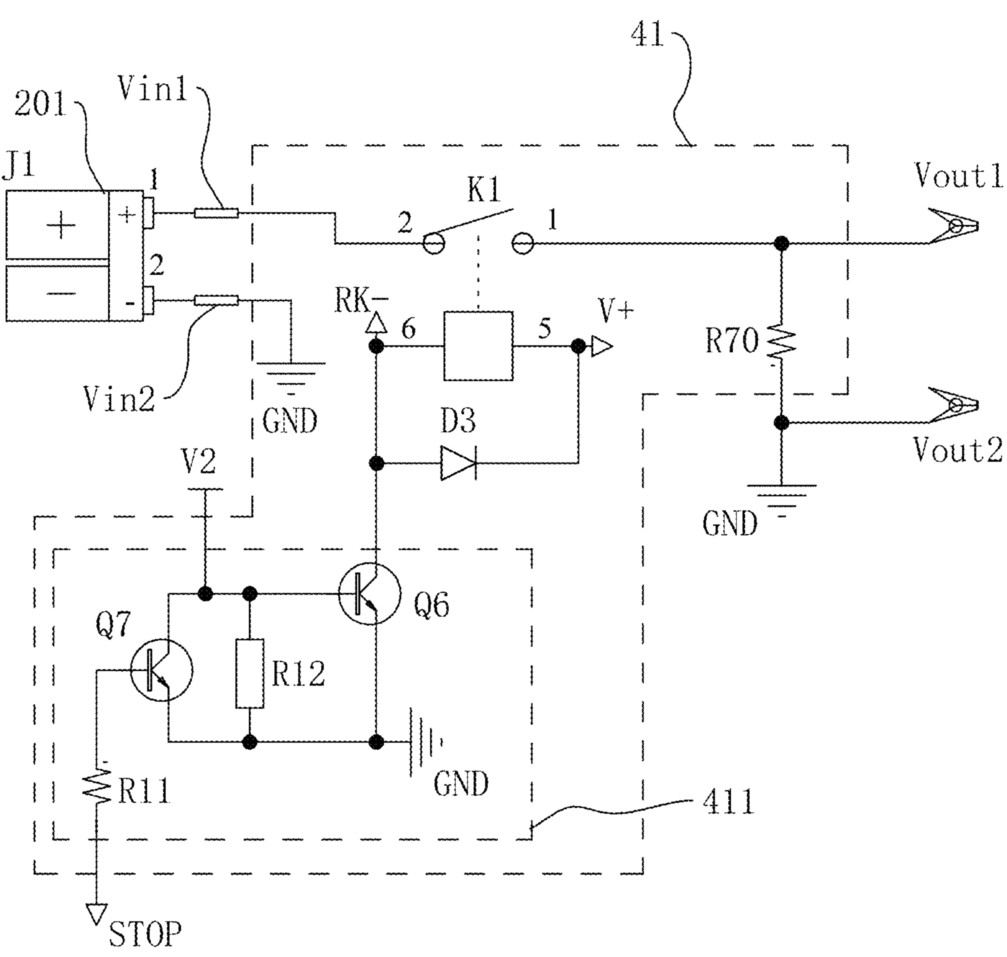
FIG. 6 is a schematic diagram of the circuit structure of a switch module in the jump starter shown in FIG. 4*a*.

In some embodiments, in combination with FIG. 4*a* and FIG. 6, the jump start circuit 400 further includes an access detection module for outputting a connection confirmation signal when it is detected that the first output Vout1 and the second output Vout2 are correctly connected to the first electrode and the second electrode of the load battery 601, respectively. When the connection confirmation signal is received and the electric potential fluctuation is detected to reach the fluctuation threshold, the voltage fluctuation detection module 72 outputs a starting identification signal. Understandably, if the connection confirmation signal is not received, even if it is detected that the electric potential fluctuation reaches the fluctuation threshold, the voltage fluctuation detection module 72 will not output the starting identification signal, thereby preventing the switch module 41 from entering the ON state before the first output Vout1 and the second output Vout2 are respectively correctly connected to the first electrode and the second electrode of the load battery 601, and preventing the first output Vout1 or the second output Vout2 from having arc discharge during the connection process.

Understandably, when correctly connected, the first output Vout1 forms a stable electrical contact with the first electrode of the load battery 601, and the second output Vout2 forms a stable electrical contact with the second electrode of the load battery 601.

In some embodiments, in combination with FIG. 4*a*, the jump start circuit 400 further includes a first switch control module 46. The first switch control module 46 is electrically connected between the voltage fluctuation detection module 72 and the switch module 41. The first switch control module 46 controls the states of the switch module 41 at least based on the starting identification signal. Understandably, the starting identification signal can be directly transmitted to the first switch control module 46, and the starting identification signal has an indirect triggering effect on the switch module 41. The first switch control module 46 can control the switch module 41 to switch to the ON state or control the switch module 41 to switch to the OFF state.

In some embodiments, as shown in FIG. 4*a*, when the connection confirmation signal is received but the starting identification signal is not received, the first switch control module 46 alternately timings the power-on period and the detection period in time. The first switch control module 46 triggers the switch module 41 to switch to the ON state during the power-on period and triggers the switch module 41 to switch to the OFF state during the detection period. It can be understood that since the switch module 41 is in the ON state during the power-on period, the voltage of the starting power supply 201 can be intermittently transmitted to the first electrode and the second electrode of the load battery 601 through the first output Vout1 and the second output Vout2, thereby providing a charging voltage for the load battery 601, and ensuring that the output voltage of the starting power supply 201 can be transmitted to the electrical load 602 in the automobile when the automobile ignition operation occurs.

During the detection period, the switch module 41 is in the OFF state, so the path between the starting power supply 201 and the first output Vout1 disappears, and the output voltage of the starting power supply 201 will not be applied to the first output Vout1. At this time, if the first output Vout1 and the second output Vout2 are correctly connected to the first electrode and the second electrode of the load battery 601 respectively, then the voltage of the first output Vout1 can reflect the voltage between the first electrode and the second electrode of the load battery 601. It can be understood that the setting of the detection period creates a detection condition for the correct connection of the first output Vout1 and the second output Vout2.

It is understandable that when the first output Vout1 or the second output Vout2 is removed from the load battery 601, during the detection period, since the switch module 41 is in the OFF state, the voltage between the first output Vout1 and the second output Vout2 can reflect the connection relationship between the first output Vout1 and the second output Vout2 and the electrodes of the load battery 601, thereby creating a condition for determining the correct connection between the first output Vout1 and the second output Vout2 and the electrodes of the load battery 601.

Specifically, the duration of the power-on period is greater than the duration of the detection period. It is understandable that when the duration of the detection period is shorter than the duration of the power-on period, the power supply to the load battery 601 will not be significantly affected. More specifically, when the duration of the detection period is much shorter than the duration of the power-on period, the intermittent power transfer from the starting power supply 201 to the load battery 601 is close to the continuous power transfer in performance.

In some embodiments, the duration of the power-on period ranges from 0.5s to 30s. In some embodiments, the duration of the power-on period is 1s, 3s, 5s, 10s, or 20s. In some embodiments, the duration of the detection period ranges from 5 ms to 1s. In some embodiments, the duration of the detection period is 10 ms, 15 ms, 30 ms, 400 ms, or 800 ms.

In some embodiments, as shown in FIG. 4*a*, when the connection confirmation signal and the starting identification signal are both received, the first switch control module 46 controls the switch module 41 to maintain the ON state, thereby preventing the switch module 41 from entering the ON state before the first output Vout1 and the second output Vout2 are respectively correctly connected to the first electrode and the second electrode of the load battery 601, and preventing the first output Vout1 or the second output Vout2 from having arc discharge during the connection process. Meanwhile, during the ignition operation, the switch module 41 is prevented from being affected by other modules and switching to the OFF state, which is beneficial for providing sufficient input power to the electrical load 602 and ensuring the success rate of ignition.

Understandably, when the connection confirmation signal and the starting identification signal are both received at the same time, the first switch control module 46 controls the switch module 41 to stably maintain the ON state, avoiding the switch module 41 from repeatedly switching between the ON state and the OFF state, so as to provide sufficient input power to the electrical load 602. At the same time, it avoids the switch module 41 from switching ON and OFF when a large current needs to pass through, reduces the component loss in the switch module 41, and is beneficial for extending the service life of the switch module 41.

Understandably, the first switch control module 46 has a ready state. In the ready state, if the first switch control module 46 does not receive the starting identification signal, the first switch control module 46 alternately timings the power-on period and the detection period in time. In the ready state, if the first switch control module 46 receives the starting identification signal, the first switch control module 46 only triggers the switch module 41 to switch to the ON state. Understandably, the connection confirmation signal can trigger the first switch control module 46 to switch to the ready state.

Optionally, the signal form of the connection confirmation signal is a high level, so that the connection confirmation signal can be used as the power supply voltage of the first switch control module 46. When the first switch control module 46 receives the connection confirmation signal, it is equivalent to the first switch control module 46 being in the power-on state.

Optionally, the connection confirmation signal may also be used as an enable signal and is input to an enable pin in the first switch control module 46 to switch the first switch control module 46 from a disabled state to a ready state.

In some embodiments, in combination with FIG. 4*a*, the access detection module includes a first access detection module 47, and the first access detection module 47 is configured to detect the voltage of the first output Vout1. When the voltage of the first output Vout1 is greater than a first voltage threshold, the first access detection module 47 outputs a connection confirmation signal. Specifically, the first access detection module 47 is mainly configured to confirm that the first output Vout1 and the second output Vout2 are respectively correctly connected to the first electrode and the second electrode of the load battery 601 when the switch module 41 is in the OFF state and the vehicle ignition operation does not occur.

Understandably, when the first output Vout1 and the second output Vout2 are correctly connected to the first electrode and the second electrode of the load battery 601 respectively, and the switch module 41 is in the OFF state and the vehicle ignition operation does not occur, the voltage of the load battery 601 is applied between the first output Vout1 and the second output Vout2. Since the first access detection module 47 is electrically connected to the first output Vout1 and the voltage of the load battery 601 is generally greater than the first voltage threshold, the first access detection module 47 outputs a connection confirmation signal when it is identified that the voltage of the first output Vout1 is greater than the first voltage threshold.

Understandably, the first access detection module 47 is configured to confirm that the first output Vout1 and the second output Vout2 are respectively correctly connected to the first electrode and the second electrode of the load battery 601 according to the magnitude relationship between the voltage of the first output Vout1 and the first voltage threshold during the detection period.

Specifically, during the detection period, the switch module 41 electrically isolates the first output Vout1 from the positive electrode of the starting power supply 201.

Understandably, during the detection period, if the first output Vout1 and the second output Vout2 respectively maintain conductive contact with the first electrode and the second electrode of the load battery 601, the voltage of the first output Vout1 is equal to the voltage of the first electrode of the load battery 601. Since the voltage of the first electrode of the load battery 601 is greater than the first voltage threshold, the voltage of the first output Vout1 is greater than the first voltage threshold.

Understandably, during the detection period, if at least one of the first output Vout1 and the second output Vout2 is disconnected from the electrodes of the load battery 601, there is no voltage at the first output Vout1, and the voltage of the first output Vout1 will not be greater than the first voltage threshold.

Therefore, during the detection period, the voltage of the first output Vout1 can be detected to determine whether the first output Vout1 and the second output Vout2 are correctly connected to the first electrode and the second electrode of the load battery 601.

Optionally, the first switch control module 46 is electrically connected to a control end of the switch module 41.

Exemplarily, the first access detection module 47 is electrically connected between the first output Vout1 and the second output Vout2.

Figure 8:
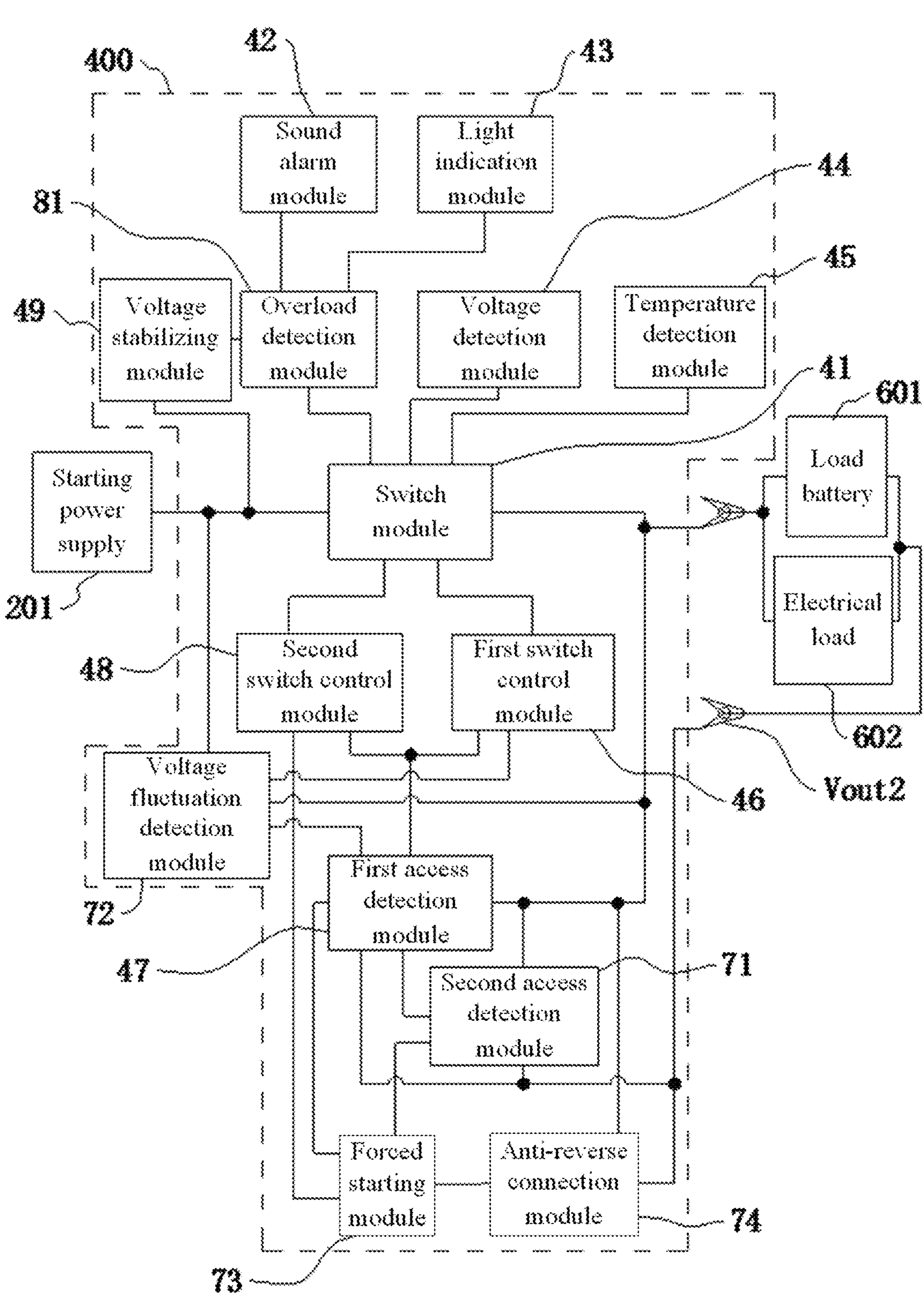
FIG. 8 is a schematic diagram of the structure of a jump start circuit according to an embodiment of the present disclosure.

Optionally, in combination with FIG. 4*a* and FIG. 8, the first access detection module 47 is configured to be electrically connected between a reference voltage point and the first switch control module 46. The first access detection module 47 has an ON state and an OFF state between the reference voltage point and the first switch control module 46. When the voltage of the first output Vout1 is greater than the first voltage threshold, the first access detection module 47 is in an ON state, so that the first access detection module 47 outputs a connection confirmation signal in the form of a high level to the outside. Understandably, when the first access detection module 47 is in the ON state, the first switch control module 46 is electrically connected to the reference voltage point through the first access detection module 47, so that the first switch control module 46 obtains power to alternately timing the power-on period and the detection period in time, and triggers the switch module 41 to switch to the ON state during the power-on period.

In some other embodiments, the first access detection module 47 is not connected between the reference voltage point and the first switch control module 46. That is, the first switch control module 46 does not need to obtain working current through the first access detection module 47. Understandably, the connection confirmation signal can be configured to trigger the internal branch of the first switch control module 46, so that the working current can flow into the first switch control module 46 through the internal branch.

Understandably, in combination with FIG. 4*a*, after the first output Vout1 and the second output Vout2 are respectively correctly connected to the two electrodes of the load battery 601, under the voltage of the load battery 601, the voltage of the first output Vout1 is greater than the first voltage threshold. Thereafter, if the vehicle ignition operation occurs, the voltage of the first output Vout1 will drop from greater than the first voltage threshold to less than or equal to the first voltage threshold due to the high load impact of the electrical load 602. Therefore, when the switch module 41 is in the OFF state and the vehicle ignition operation occurs, it is difficult for the first access detection module 47 to determine whether the first output Vout1 and the second output Vout2 are respectively correctly connected to the two electrodes of the load battery 601 based on the voltage of the first output Vout1.

In some embodiments, in combination with FIG. 4*a*, the access detection module includes a second access detection module 71. The second access detection module 71 is configured to output a detection voltage to the first output Vout1, and the detection voltage decreases as the resistance value between the first output Vout1 and the second output Vout2 decreases. When the detection voltage is less than a second voltage threshold, at least one of the second access detection module 71 and the first access detection module 47 outputs a connection confirmation signal. Specifically, the second access detection module 71 is configured to confirm that the first output Vout1 and the second output Vout2 are correctly connected to the first electrode and the second electrode of the load battery 601, respectively, when the switch module 41 is in the OFF state and the vehicle ignition operation occurs.

Understandably, when the first output Vout1 and the second output Vout2 are correctly connected to the first electrode and the second electrode of the load battery 601, respectively, and the vehicle ignition operation occurs, according to the circuit model of the load battery 601, even if the voltage between the first electrode and the second electrode of the load battery 601 drops to near zero due to the excessive electrical load 602, the load battery 601 and the electrical load 602 still have resistance, respectively.

When the first output Vout1 and the second output Vout2 are correctly connected to the first electrode and the second electrode of the load battery 601 respectively, the other resistive devices between the first output Vout1 and the second output Vout2 form a parallel connection with the internal resistance of the load battery 601, and the resistance value between the first output Vout1 and the second output Vout2 is less than the resistance value of any one of the internal resistance of the load battery 601 and the other resistive devices between the first output Vout1 and the second output Vout2. Therefore, when the vehicle ignition operation occurs, although the voltage of the first output Vout1 cannot be guaranteed to be greater than the first voltage threshold, under the parallel connection effect of the load battery 601 and the electrical load 602, the resistance value between the first output Vout1 and the second output Vout2 is relatively reduced, so that the detection voltage is less than the second voltage threshold. At least one of the second access detection module 71 and the first access detection module 47 outputs a connection confirmation signal at this time, thereby preventing the first switch control module 46 from exiting the ready state due to the elimination of the connection confirmation signal, ensuring that the voltage of the starting power supply 201 can be transmitted to the load battery 601 in time after the detection period ends, avoiding the voltage drop caused by the ignition operation keeping the switch module 41 completely in the OFF state, thereby ensuring that the charging and ignition power supply to the load battery 601 are not affected by the voltage drop of the load battery 601.

Understandably, the other resistive devices between the first output Vout1 and the second output Vout2 may be a resistance element inside the second access detection module 71 or a resistance element outside the second access detection module 71.

Understandably, during the detection period, when the vehicle ignition operation does not occur, the first access detection module 47 is configured to confirm that the first output Vout1 and the second output Vout2 are correctly connected to the first electrode and the second electrode of the load battery 601, respectively, according to the magnitude relationship between the voltage of the first output Vout1 and the first voltage threshold. The second access detection module 71 is configured to confirm that the first output Vout1 and the second output Vout2 are correctly connected to the first electrode and the second electrode of the load battery 601, respectively, according to the magnitude relationship between the detection voltage and the second voltage threshold, when the vehicle ignition operation occurs.

Understandably, during the detection period, if at least one of the first output Vout1 and the second output Vout2 is removed from the electrodes of the load battery 601, the other resistive devices between the first output Vout1 and the second output Vout2 are not connected in parallel with the load battery 601, so that the resistance value between the first output Vout1 and the second output Vout2 increases, and the detection voltage is not less than the second voltage threshold, so that the connection confirmation signal will not be generated.

In some embodiments, when the connection confirmation signal does not exist, the first switch control module 46 exits the ready state. Since it is not triggered by the first switch control module 46, the switch module 41 remains in the OFF state, and the output voltage of the starting power supply 201 stops being applied between the first output Vout1 and the second output Vout2, so that after the first output Vout1 and the second output Vout2 are removed respectively from the first electrode and the second electrode of the load battery 601, a short circuit contact is prevented between the first output Vout1 and the second output Vout2.

Figure 7:
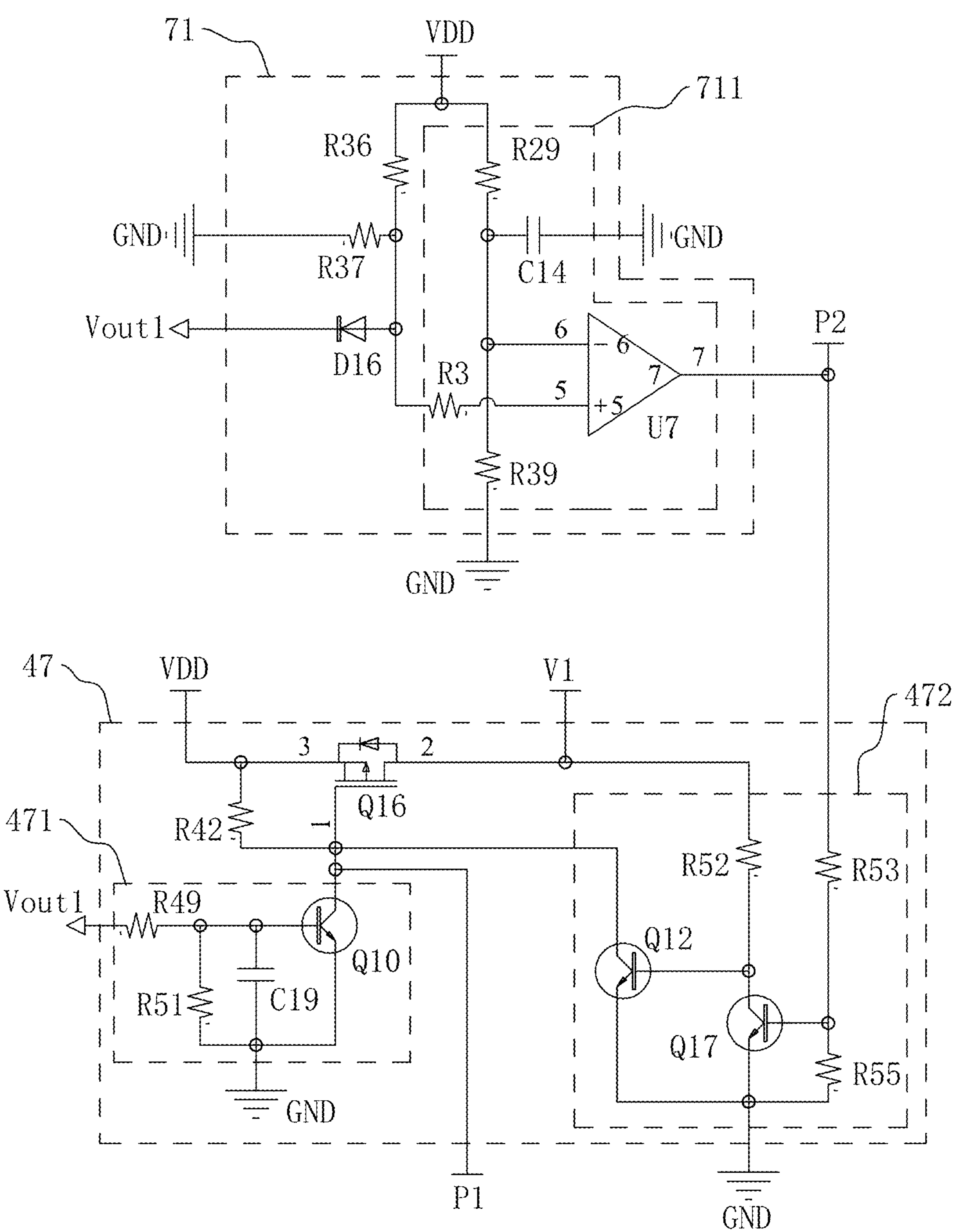
FIG. 7 is a schematic diagram of the circuit structure of a first access detection module and a second access detection module in the jump starter shown in FIG. 4*a*.

Optionally, in combination with FIG. 4*a* and FIG. 7, the second access detection module 71 is electrically connected to the first access detection module 47.

In some embodiments, when the voltage at the first output Vout1 is greater than the first voltage threshold, the first access detection module 47 outputs a connection confirmation signal. When the detection voltage is less than the second voltage threshold, the second access detection module 71 triggers the first access detection module 47 to output a connection confirmation signal. Thus, when the detection voltage is less than the second voltage threshold, the connection confirmation signal is indirectly output to the first switch control module 46 through the first access detection module 47.

Exemplarily, when the detection voltage is less than the second voltage threshold, the second access detection module 71 outputs a resistive access signal to the first access detection module 47. The resistive access signal is configured to trigger the first access detection module 47 to output a connection confirmation signal. Exemplarily, the resistive access signal is configured to trigger the first access detection module 47 to switch to the ON state, so that the working current is transmitted from the reference voltage point to the first switch control module 46.

In some other embodiments, the second access detection module 71 is electrically connected to the first switch control module 46. When the detection voltage is less than the second voltage threshold, the second access detection module 71 directly outputs a connection confirmation signal to the first switch control module 46.

In some embodiments, during a window period after the voltage of the first output Vout1 drops below the first voltage threshold, when the detection voltage is less than the second voltage threshold, the first switch control module 46 is maintained in a ready state under the triggering of the second access detection module 71. It can be understood that before the voltage of the first output Vout1 is greater than the first voltage threshold, the first output Vout1 and the second output Vout2 have not completed connection with the two electrodes of the load battery 601. At this time, the first switch control module 46 will not enter the ready state only under the triggering of the second access detection module 71, thereby avoiding the output voltage of the starting power supply 201 from being transmitted, under the effect of the first switch control module 46, to the position between the first output Vout1 and the second output Vout2, and preventing the first output Vout1 and the second output Vout2 from being in contact and short-circuiting.

Understandably, after the voltage of the first output Vout1 drops below the first voltage threshold, the first switch control module 46 will respond to the triggering of the second access detection module 71 within the window period and maintain the ready state. After the voltage of the first output Vout1 is not greater than the first voltage threshold for a long time, the first output Vout1 and the second output Vout2 may have been removed from the two electrodes of the load battery 601. Since the first switch control module 46 no longer responds to the triggering of the second access detection module 71 to enter the ready state after the window period, this avoids short circuit contact between the first output Vout1 and the second output Vout2 after they are removed from the two electrodes of the load battery 601. More specifically, the time starting point of the window period may correspond to the time point when the voltage of the first output Vout1 drops to be equal to the first voltage threshold. The duration of the window period may be set according to actual conditions. In one embodiment, the duration of the window period is not greater than the duration of the detection period.

Exemplarily, when the voltage of the first output Vout1 drops below the first voltage threshold, the first switch control module 46 is triggered by the second access detection module 71 to enter the ready state within the window period, and the ready state of the first switch control module 46 is maintained at least until the detection voltage is no longer less than the second voltage threshold.

Specifically, if the load battery 601 is in a poor condition, the voltage of the two electrodes of the load battery 601 will also be less than or equal to the first voltage threshold when the vehicle ignition operation does not occur, resulting in the voltage of the first output Vout1 cannot be greater than the first voltage threshold and the first access detection module 47 will not trigger the first switch control module 46 to enter the ready state after the first output Vout1 and the second output Vout2 are respectively correctly connected to the two electrodes of the load battery 601. At the same time, in order to deal with the short circuit between the first output Vout1 and the second output Vout2, the first switch control module 46 will switch to the ready state under the triggering of the second access detection module 71 only after the voltage of the first output Vout1 is greater than the first voltage threshold. Therefore, when the load battery 601 is in poor condition, the first switch control module 46 cannot switch to the ready state when it is triggered by the first access detection module 47 or the second access detection module 71, resulting in the first output Vout1 and the second output Vout2 being unable to provide charging voltage for the load battery 601.

Figure 9:
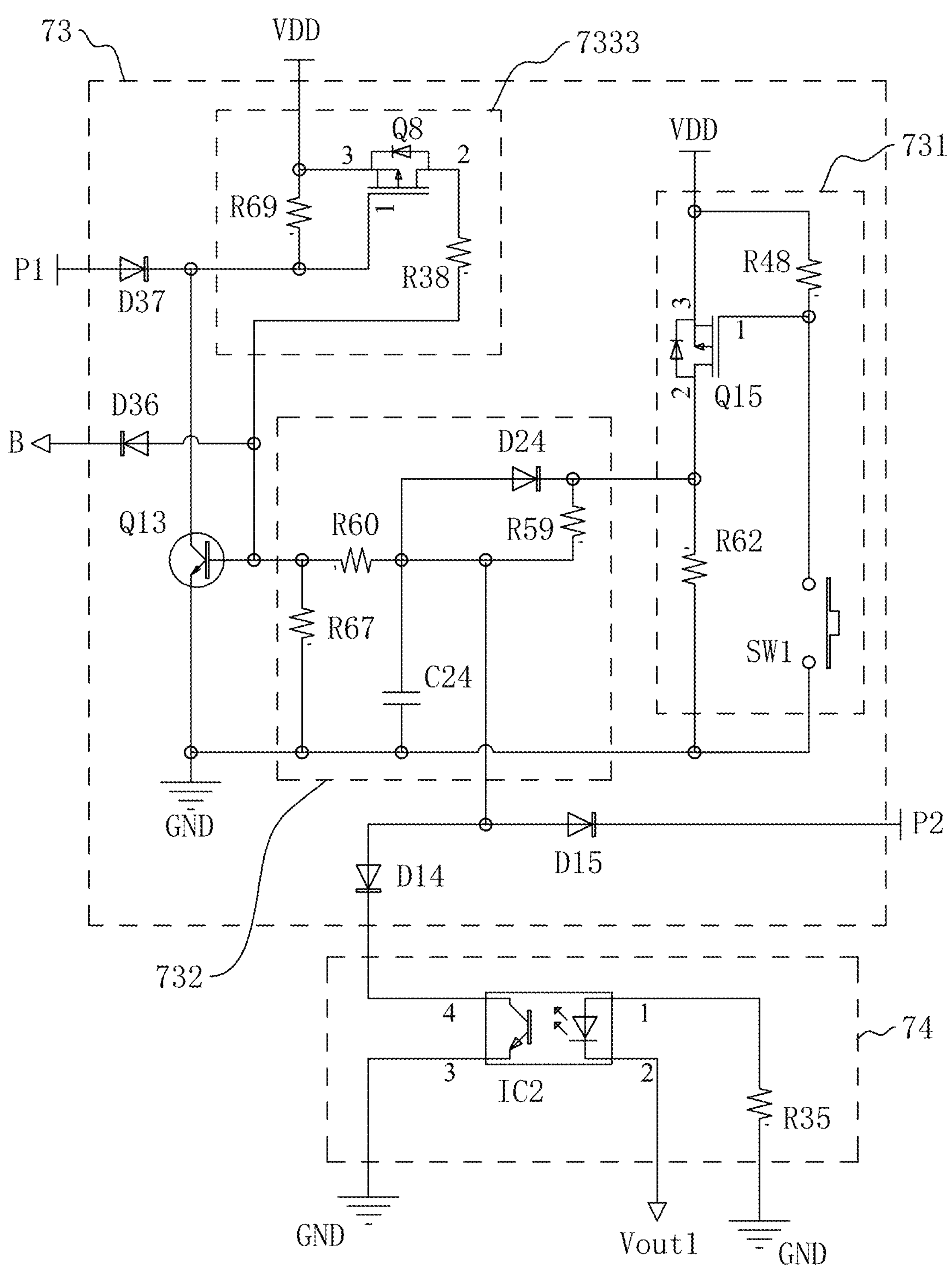
FIG. 9 is a schematic diagram of the circuit structure of a forced starting module and an anti-reverse connection module in the jump start circuit shown in FIG. 8.

In some embodiments, in combination with FIG. 8 and FIG. 9, the jump start circuit 400 further includes a forced starting module 73. When under manual control, the forced starting module 73 is configured to trigger the first switch control module 46 to switch to the ready state. Specifically, the triggering to the first switch control module 46 by the forced starting module 73 will not be restricted by the condition that the voltage of the first output Vout1 needs to be greater than the first voltage threshold, so that the first switch control module 46 can be switched to the ready state when the load battery 601 is in a poor condition, and the voltage of the starting power supply 201 can be transmitted to the load battery 601.

Specifically, when under manual control, the forced starting module 73 generates a forced starting signal. The forced starting signal is configured to trigger the first switch control module 46 to maintain the ready state. After the first switch control module 46 switches to the ready state under the triggering of the forced starting module 73, the ready state of the first switch control module 46 continues until the forced starting signal disappears. Exemplarily, the signal form of the forced starting signal is a low level.

Optionally, in combination with FIG. 7 and FIG. 9, the forced starting module 73 can be electrically connected to the first access detection module 47, and the forced starting signal acts on the first access detection module 47. The forced starting signal facilitates the first access detection module 47 to output a connection confirmation signal, thereby maintaining the first switch control module 46 in a ready state.

Optionally, the forced starting module 73 can also be electrically connected to the first switch control module 46.

In some embodiments, before the first switch control module 46 enters the ready state, when the detection voltage is less than the second voltage threshold, the second access detection module 71 is further configured to inhibit the triggering to the first switch control module 46 by the forced starting module 73. It can be understood that before the first switch control module 46 is triggered by the forced starting module 73, if there is a short circuit between the first output Vout1 and the second output Vout2, it may cause the starting power supply 201 to heat up severely or even be damaged. Since the detection voltage decreases with the decrease of the resistance value of the first output Vout1 and the second output Vout2, when there is a short circuit between the first output Vout1 and the second output Vout2, the resistance value between the first output Vout1 and the second output Vout2 is less than the internal resistance of the load battery 601, then the detection voltage will be less than the second voltage threshold. Since the second access detection module 71 inhibits the triggering to the first switch control module 46 by the forced starting module 73, the first switch control module 46 cannot enter the ready state, thereby preventing the voltage of the starting power supply 201 from being transmitted to the position between the first output Vout1 and the second output Vout2, and avoiding serious heating or damage to the starting power supply 201.

Specifically, with regard to that the second access detection module 71 inhibits the triggering of the forced starting module 73, it can be understood as the second access detection module 71 inhibits the forced starting module 73 from outputting a signal that triggers the first switch control module 46 to enter the ready state, and can also be understood as the second access detection module 71 inhibits the first switch control module 46 from responding to the triggering of the forced starting module 73.

In some other embodiments, the second access detection module 71, the first access detection module 47, and the forced starting module 73 are respectively configured to be electrically connected in parallel between the reference voltage point and the first switch control module 46. By switching between the ON state and the OFF state by the second access detection module 71, the first access detection module 47 or the forced starting module 73, the power supply input of the first switch control module 46 can be controlled, so that the first switch control module 46 enters or exits the ready state.

Figure 10:
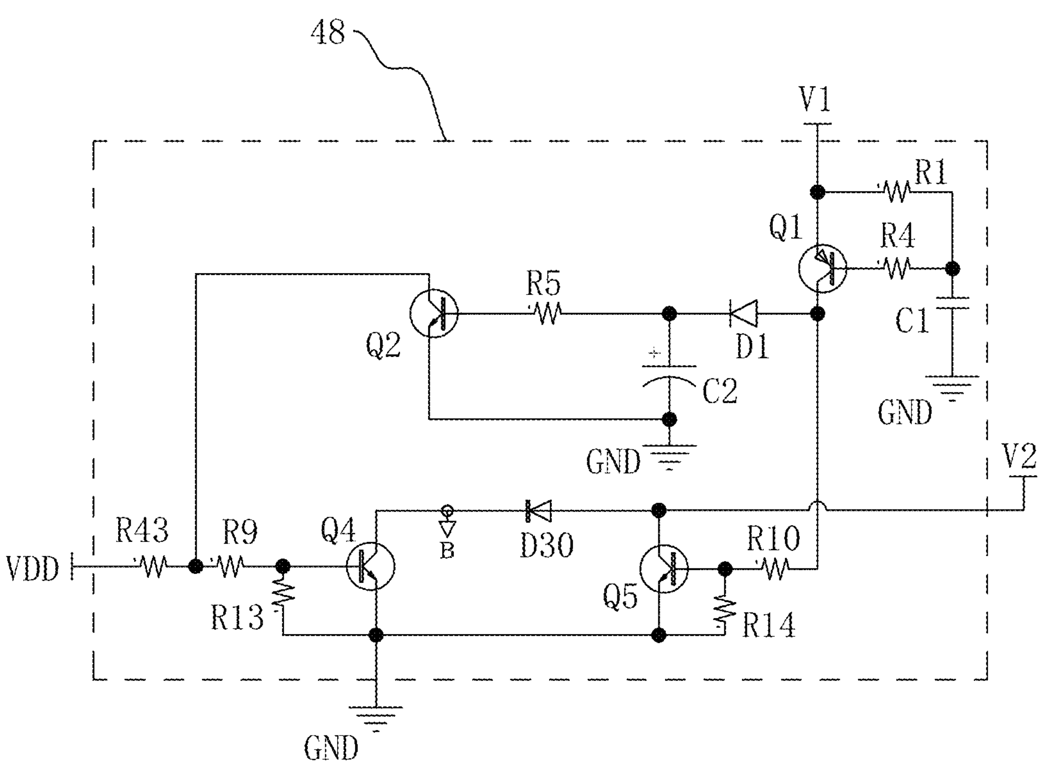
FIG. 10 is a schematic diagram of the circuit structure of a second switch control module in the jump start circuit shown in FIG. 8.

In some embodiments, in combination with FIG. 8 and FIG. 10, the jump start circuit 400 further includes a second switch control module 48 electrically connected to the switch module 41. After receiving the connection confirmation signal, the second switch control module 48 starts to enable timing. It can also be understood that after the connection confirmation signal appears, the second switch control module 48 starts to enable timing. After a time period defined by the enabled timing ends, the jump start circuit 400 enters the standby state, and the switch module 41 remains in the OFF state under the triggering of the second switch control module 48, thereby avoiding the circuit between the starting power supply 201 and the load battery 601 from being turned on for a long time, preventing the power of the starting power supply 201 from being consumed unnecessarily, and preventing the starting power supply 201 from being overheated due to continuous power-on.

In some embodiments, after the access detection module outputs a connection confirmation signal, the second switch control module 48 starts to enable timing. In the case of receiving the connection confirmation signal, when the starting identification signal appears, the switch module 41 begins to remain in the ON state. Understandably, after the starting identification signal appears, if the starting identification signal has not been eliminated when the time period defined by the enabled timing ends, then the switch module 41 switches from remaining in the ON state to remaining in the OFF state. After the starting identification signal appears, if the time period defined by the enabled timing has not ended when the starting identification signal is eliminated, then the switch module 41 switches from remaining in the ON state to alternately switching between the ON state and the OFF state, and after the time period defined by the enabled timing ends, the switch module 41 remains in the OFF state.

Understandably, the time difference between the time point when the ignition operation begins to occur and the time starting point when the timing is enabled is a random value.

Exemplarily, the second switch control module 48 is electrically connected to the switch module 41.

In some embodiments, the response priority of the switch module 41 to the first switch control module 46, the second switch control module 48 and a stop signal is, from high to low: the stop signal, the second switch control module 48 and the first switch control module 46.

Understandably, before the time period defined by the enabled timing ends, and the stop signal is not generated, the switch module 41 is controlled by the first switch control module 46. When the time period defined by the enabled timing ends or the stop signal is generated, the switch module 41 remains in the OFF state and is not affected by the first switch control module 46.

In some embodiments, as shown in FIG. 7 and FIG. 10, the first access detection module 47 is further electrically connected between the reference voltage point and the second switch control module 48. When the first access detection module 47 is in an ON state between the reference voltage point and the first switch control module 46, the first access detection module 47 is also in an ON state between the reference voltage point and the second switch control module 48. The second switch control module 48 starts to enable timing after obtaining power supply from the reference voltage point.

In some embodiments, when the first switch control module 46 switches to the ready state under the triggering of the forced starting module 73, the second switch control module 48 starts to enable timing. After the time period defined by the enabled timing ends, the triggering to the first switch control module 46 by the forced starting module 73 is suppressed by the second switch control module 48, so that the triggering to the first switch control module 46 by the forced starting module 73 is also time-limited, preventing the forced starting module 73 from causing the circuit between the starting power supply 201 and the load battery 601 to be turned on for a long time.

Exemplarily, as shown in FIG. 8, after the first output Vout1 and the second output Vout2 are respectively correctly connected to the first electrode and the second electrode of the load battery 601, the switch module 41 starts to alternately switch between the ON state and the OFF state, and at the same time, the second switch control module 48 starts to enable the timing.

Thereafter, if the user starts the engine, the voltage of the first output Vout1 will drop significantly. Under the effect of the starting identification signal, the first switch control module 46 keeps the switch module 41 in the ON state. When the ignition operation is completed before the time period defined by the enabled timing ends, then after the ignition operation is completed, the starting identification signal is eliminated, and the switch module 41 returns to alternately switching between the ON state and the OFF state. After the time period defined by the enabled timing ends, the switch module 41 remains in the OFF state. When the ignition operation is not completed when the time period defined by the enabled timing ends, the switch module 41 remains in the OFF state when the time period defined by the enabled timing ends.

After the time period defined by the enabled timing starts, if the user has not started the engine, then the voltage drop at the first output Vout1 does not reach the fluctuation threshold, and the starting identification signal is not generated. Before the time period defined by the enabled timing ends, the switch module 41 keeps switching alternately between the ON state and the OFF state.

Understandably, when the voltage direction of the starting power supply 201 and the voltage direction of the load battery 601 are in the same direction in the electrical path, this will cause the starting power supply 201 and the load battery 601 to heat up severely or even get damaged.

In some embodiments, in combination with FIG. 8 and FIG. 9, the jump start circuit 400 further includes an anti-reverse connection module 74. The anti-reverse connection module 74 is configured to be electrically connected between the first output Vout1 and the second output Vout2. When there is a reverse voltage between the first output Vout1 and the second output Vout2, that is, when the voltage of the second output Vout2 is higher than the voltage of the first output Vout1, the anti-reverse connection module 74 will suppress the triggering effect of the forced starting module 73 on the first switch control module 46, thereby avoiding the circuit between the starting power supply 201 and the load battery 601 to be turned on. Specifically, the anti-reverse connection module 74 can also be understood as being configured to be electrically connected between the first output Vout1 and the ground.

Exemplarily, the first output Vout1 is designated for connecting with the first electrode of the load battery 601, and the first output Vout1 has a red mark. The second output Vout2 is designated for connecting with the second electrode of the load battery 601, and the second output Vout2 has a black mark. When the black second output Vout2 is connected with the first electrode of the load battery 601, and the red first output Vout1 is connected with the second electrode of the load battery 601, there is a reverse voltage between the first output Vout1 and the second output Vout2 under the voltage of the load battery 601. Since there is a reverse voltage between the first output Vout1 and the second output Vout2, the anti-reverse connection module 74 suppresses the forced starting module 73 from triggering the first switch control module 46, preventing the first switch control module 46 from triggering the switch module 41 to turn on in the ready state, thereby avoiding serious heating or damage to the starting power supply 201 and the load battery 601.

Specifically, with regard to that the anti-reverse connection module 74 inhibits the triggering of the forced starting module 73, it can be understood as the anti-reverse connection module 74 restricts the forced starting module 73 from outputting a signal that triggers the first switch control module 46 to enter the ready state, and can also be understood as the anti-reverse connection module 74 restricts the first switch control module 46 from responding to the triggering of the forced starting module 73.

Figure 12:
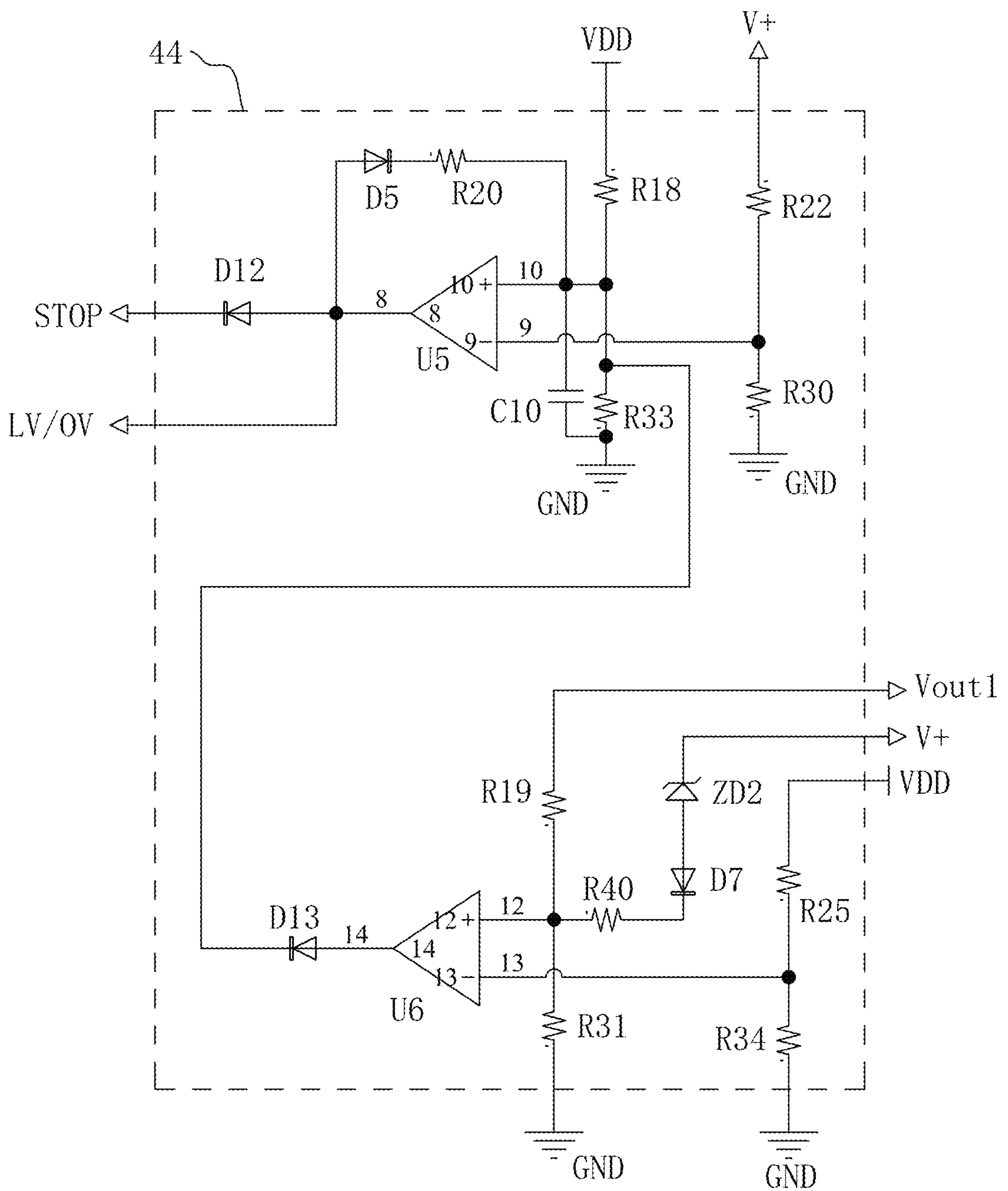
FIG. 12 is a schematic diagram of the circuit structure of a voltage detection module in the jump start circuit shown in FIG. 8.

In some embodiments, in combination with FIG. 8 and FIG. 12, the jump start circuit 400 further includes a voltage detection module 44. The voltage detection module 44 is configured to detect an abnormal voltage state of the front and rear ends of the jump start circuit 400. Specifically, the abnormal voltage state includes at least one of the following situations:

The output voltage of the starting power supply 201 is lower than a third voltage threshold;

The output voltage of the starting power supply 201 is greater than a fourth voltage threshold;

The voltage of the first electrode of the load battery 601 is greater than a fifth voltage threshold.

It can be understood that when the voltage at the first input terminal Vin1 is lower than the third voltage threshold, the output voltage of the starting power supply 201 is relatively low. When the voltage at the first input terminal Vin1 is greater than the fourth voltage threshold, the output voltage of the starting power supply 201 is relatively high. When the voltage at the first output Vout1 is greater than the fifth voltage threshold, the voltage at the first electrode of the load battery 601 is relatively high.

Exemplarily, the third voltage threshold is 13.5V. The fourth voltage threshold is 17.5V.

Exemplarily, the fifth voltage threshold is 17.5V.

In some embodiments, the voltage detection module 44 is configured to output a stop signal under the abnormal voltage state. When receiving the stop signal, the switch module 41 switches to an OFF state.

In some embodiments, the voltage detection module 44 is further configured to output a voltage abnormality warning signal in the abnormal voltage state. Exemplarily, the stop signal and the voltage abnormality warning signal are in the form of a high level.

Figure 13:
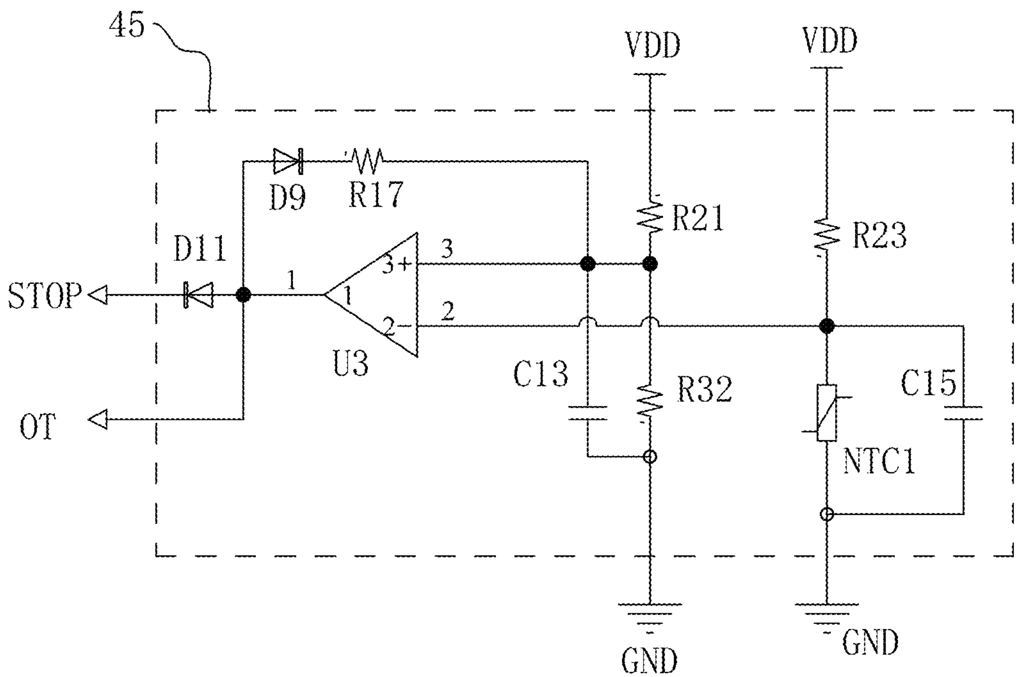
FIG. 13 is a schematic diagram of the circuit structure of a temperature detection module in the jump start circuit shown in FIG. 8.

In some embodiments, in combination with FIG. 8 and FIG. 13, the jump start circuit 400 further includes a temperature detection module 45. The temperature detection module 45 is configured to detect the temperature near the jump start circuit 400. Further, the temperature detection module 45 is configured to output a stop signal when the actual temperature is higher than a temperature threshold. When receiving the stop signal, the switch module 41 switches to an OFF state.

In some embodiments, the temperature detection module 45 is also configured to output an over-temperature warning signal when the actual temperature is higher than the temperature threshold. Optionally, the over-temperature warning signal is in the form of a high level.

Figure 14A:
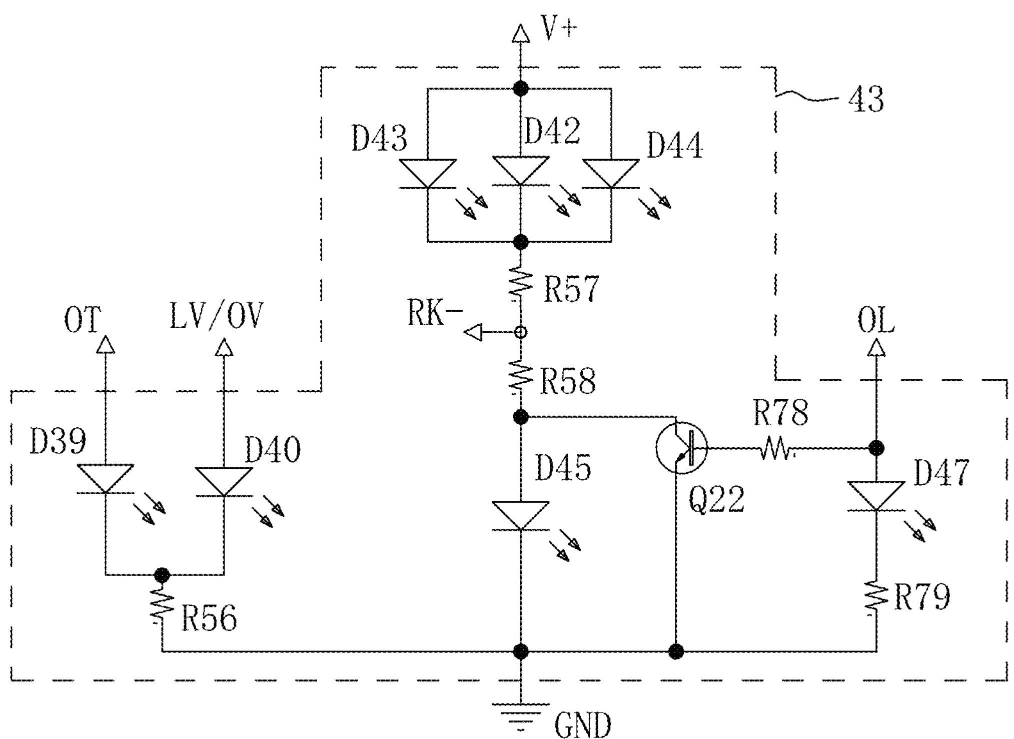
FIG. 14*a* is a schematic diagram of the circuit structure of a light indication module in the jump start circuit shown in FIG. 8.
Figure 14B:
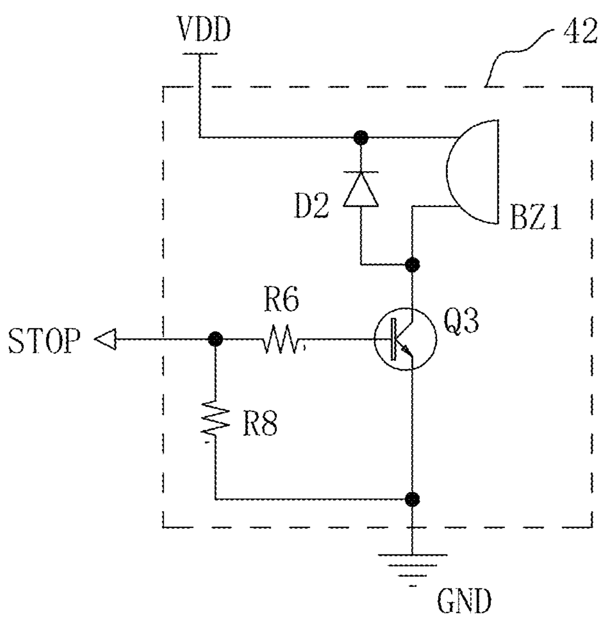
FIG. 14*b* is a schematic diagram of the circuit structure of a sound alarm module in the jump start circuit shown in FIG. 8.

In some embodiments, in combination with FIG. 8 and FIG. 14*b*, the jump start circuit 400 further includes a sound alarm module 42 at least electrically connected to the voltage detection module 44. The sound alarm module 42 is configured to emit an alarm sound when receiving the stop signal. The user can discover the abnormal situation of the jump start circuit 400 in time according to the alarm sound.

In some embodiments, in combination with FIG. 8 and FIG. 14*a*, the jump start circuit 400 further includes a light indication module 43 at least electrically connected to the voltage detection module 44. Specifically, when multiple abnormal conditions use the same alarm sound, the user can distinguish different abnormal conditions through the differences in color, brightness or flashing frequency of the light.

In some embodiments, the light indication module 43 is also configured to emit a voltage abnormality warning light when receiving the voltage abnormality warning signal.

In some embodiments, the light indication module 43 is also configured to emit an over-temperature warning light when receiving the over-temperature warning signal.

Figure 11:
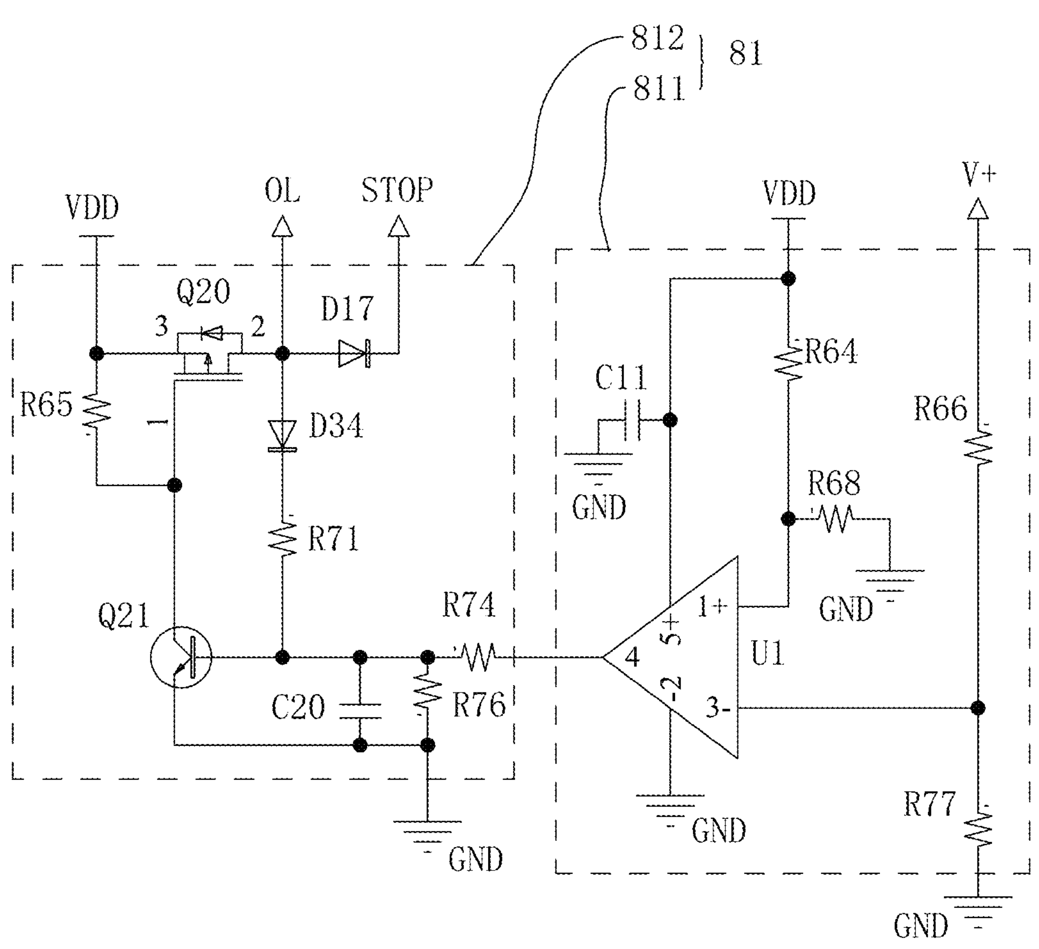
FIG. 11 is a schematic diagram of the circuit structure of an overload detection module in the jump start circuit shown in FIG. 8.

In some embodiments, in combination with FIG. 8 and FIG. 11, the jump start circuit 400 includes an overload detection module 81. The switch module 41 is configured to electrically connect between the electrodes of the starting power supply 201 and the electrodes of the load battery 601. The overload detection module 81 is configured to electrically connect to the electrodes of the starting power supply 201. The overload detection module 81 is configured to detect the electric potential difference between the first electrode and the second electrode of the starting power supply 201, and to output a stop signal when the voltage of the first electrode of the starting power supply 201 is lower than a sixth voltage threshold. When receiving the stop signal, the switch module 41 switches to the OFF state.

In some embodiments, the sixth voltage threshold is lower than the third voltage threshold. Exemplarily, the sixth voltage threshold is 6.5V.

Specifically, according to the circuit model of the starting power supply 201, when the resistance of the load battery 601 or the electrical load 602 is small, the output power of the starting power supply 201 is large, and at the same time, the voltage of the first electrode of the starting power supply 201 will be small. The overload detection module 81 detects the voltage of the first electrode of the starting power supply 201 by being electrically connected to the first electrode of the starting power supply 201. When the overload detection module 81 identifies that the voltage of the first electrode of the starting power supply 201 is lower than the sixth voltage threshold, it outputs a stop signal. The switch module 41 switches to the OFF state when receiving the stop signal, thereby interrupting the current transmission between the starting power supply 201 and the load battery 601. By properly setting the sixth voltage threshold, it can avoid serious heating to the starting power supply 201 and the conductor lines, as well as prevent damage to related electronic components in the jump start circuit 400.

In some embodiments, the overload detection module 81 is electrically connected between the first input terminal Vin1 and the second input terminal Vin2. The overload detection module 81 is configured to detect an electric potential difference between the first input terminal Vin1 and the second input terminal Vin2. The overload detection module 81 is further configured to output a stop signal when the electric potential difference between the first input terminal Vin1 and the second input terminal Vin2 is lower than a sixth voltage threshold. It can be understood that the overload detection module 81 is electrically connected to the positive electrode of the starting power supply 201 through the first input terminal Vin1, and the overload detection module 81 is electrically connected to the negative electrode of the starting power supply 201 through the second input terminal Vin2.

In some embodiments, in combination with FIG. 11 and FIG. 14*a*, the light indication module 43 is electrically connected to the overload detection module 81. The overload detection module 81 is also configured to output an overload indication signal when the voltage of the first electrode of the starting power supply 201 is lower than the sixth voltage threshold. When receiving the overload indication signal, the light indication module 43 emits an overload indicator light. Specifically, when multiple abnormal situations use the same alarm sound, the differences in the color, brightness or flashing frequency of the light can allow the user to distinguish that the starting power supply 201 has an output overload problem. In some embodiments, the overload indication signal is in the form of a high level.

In some embodiments, the light indication module 43 can emit a standby indicator light. Specifically, when the jump start circuit 400 is connected to the two electrodes of the starting power supply 201, and the voltage of the first electrode of the starting power supply 201 is not lower than the sixth voltage threshold, the light indication module 43 emits a standby indicator light. When the voltage of the first electrode of the starting power supply 201 is lower than the sixth voltage threshold, the standby indicator light is turned off while the overload indicator light is turned on, so that the user can more accurately determine the problem of output overload.

Figure 15:
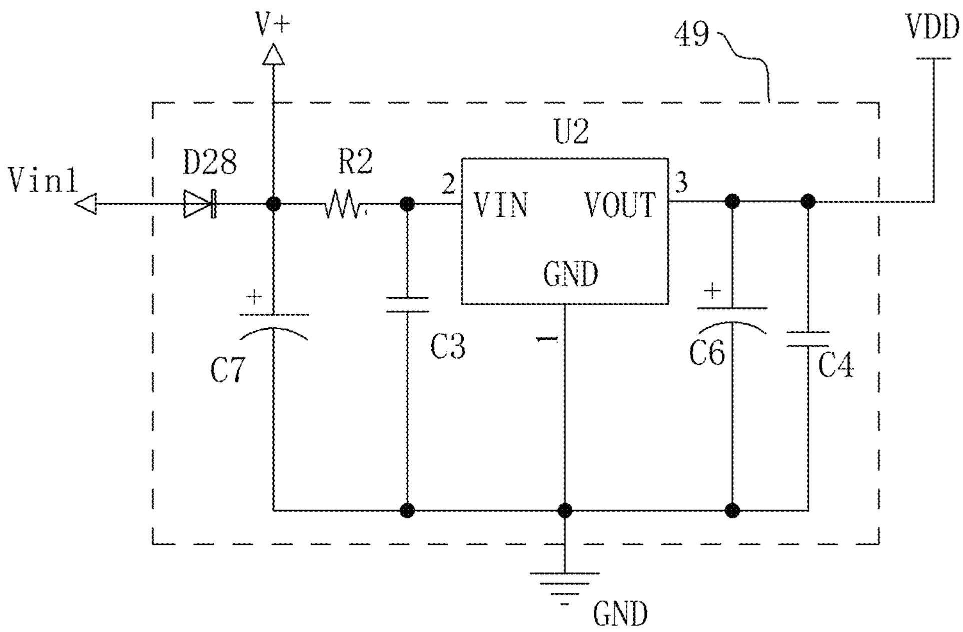
FIG. 15 is a schematic diagram of the circuit structure of a voltage stabilizing module in the jump start circuit shown in FIG. 8.

In some embodiments, in combination with FIG. 8 and FIG. 15, the jump start circuit 400 further includes a voltage stabilizing module 49, which is configured to electrically connect to the electrodes of the starting power supply 201. The voltage stabilizing module 49 is configured to provide a working voltage or a reference voltage to at least one of the overload detection module 81, the switch module 41, the sound alarm module 42, the light indication module 43, the voltage detection module 44, the temperature detection module 45, the first switch control module 46, the first access detection module 47 and the second switch control module 48. In some embodiments, the voltage stabilizing module 49 outputs a stable DC voltage after stepping down the voltage output by the positive electrode of the starting power supply 201.

In some embodiments, the output end of the voltage stabilizing module 49 is a reference voltage point. In some embodiments, the voltage stabilizing module 49 can output a reference voltage of a single amplitude. In other embodiments, the voltage stabilizing module 49 can also output multiple reference voltages of different amplitudes.

Specifically, the various reference voltages or reference voltage points mentioned in the present disclosure can be of the same voltage value or of different voltage values.

In some other embodiments, an external power supply may be configured to provide a working voltage or a reference voltage to at least one of the overload detection module 81, the switch module 41, the first switch control module 46, the first access detection module 47, the voltage detection module 44, the sound alarm module 42, the light indication module 43, the temperature detection module 45 and the second switch control module 48.

Figure 2A:
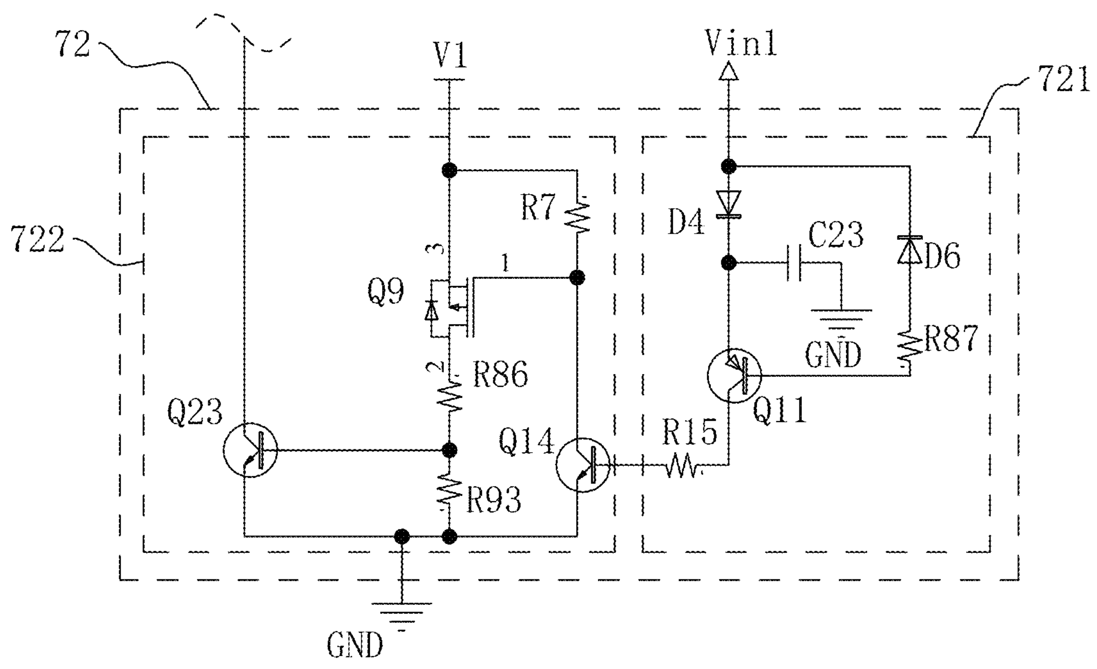
FIG. 2*a* is a schematic diagram of the circuit structure of a voltage fluctuation detection module according to an embodiment of the present disclosure.
Figure 2B:
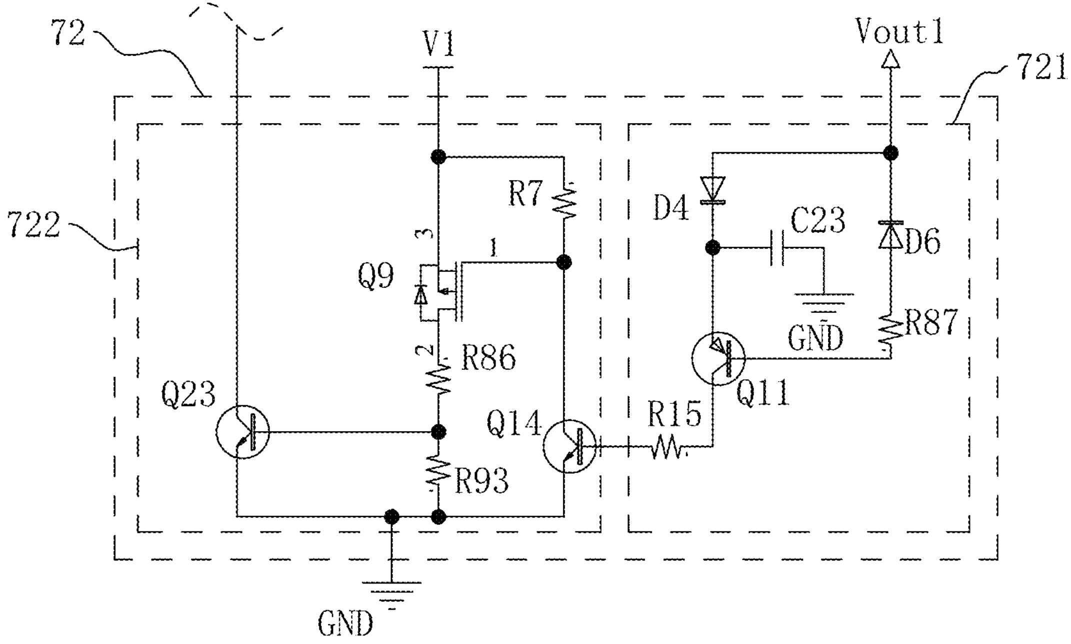
FIG. 2*b* is a schematic diagram of the circuit structure of a voltage fluctuation detection module according to another embodiment of the present disclosure.
Figure 5:
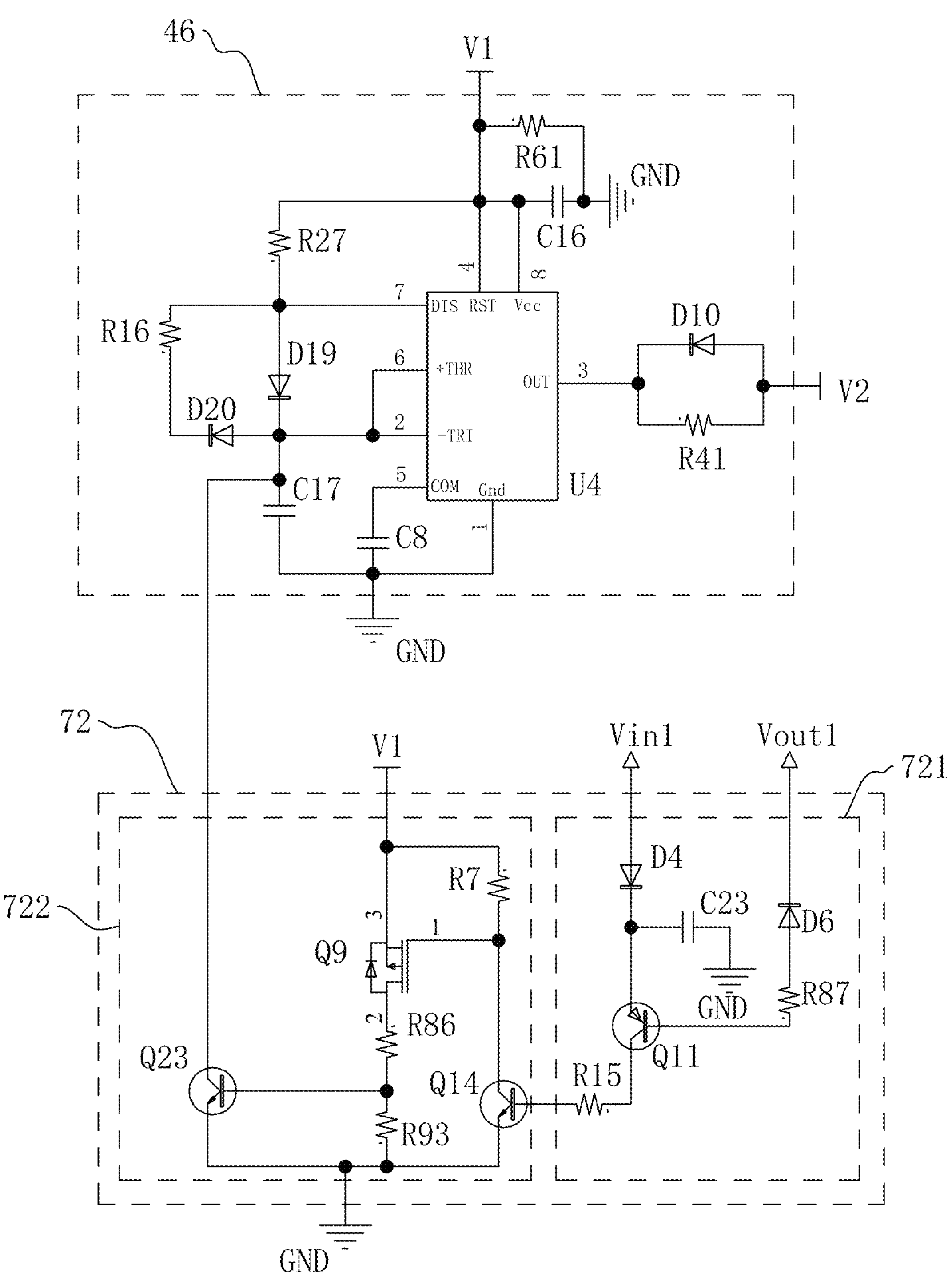
FIG. 5 is a schematic diagram of the circuit structure of a first switch control module and a voltage fluctuation detection module in the jump starter shown in FIG. 4*a*.

In some embodiments, in combination with FIG. 2*a*, FIG. 2*b* and FIG. 5, the voltage fluctuation detection module 72 includes a fluctuation detection unit 721 and an access coupling unit 722 electrically connected to the fluctuation detection unit 721. The fluctuation detection unit 721 is electrically connected to at least one of the first input terminal Vin1 and the first output Vout1. When the detected electric potential fluctuation reaches the fluctuation threshold, the fluctuation detection unit 721 outputs an ignition detection signal to the access coupling unit 722. Upon receiving the ignition detection signal and the connection confirmation signal, the access coupling unit 722 outputs a starting identification signal.

Optionally, the access coupling unit 722 is electrically connected to the first switch control module 46. Exemplarily, upon receiving the ignition detection signal and the connection confirmation signal, the access coupling unit 722 outputs a starting identification signal to the first switch control module 46, and the first switch control module 46 controls the switch module 41 to maintain the ON state.

Understandably, the access coupling unit 722 is electrically connected to the access detection module. Further, the access coupling unit 722 is electrically connected to at least one of the second access detection module 71 and the first access detection module 47 to receive a connection confirmation signal.

In some other embodiments, the fluctuation detection unit 721 may also output a starting identification signal to the first switch control module 46.

Understandably, the fluctuation detection unit 721 has voltage memory. A memory voltage is formed inside the fluctuation detection unit 721. The voltage of the first input terminal Vin1 or the first output Vout1 is used as a real-time voltage. The memory voltage has a change trend similar to the real-time voltage, but the change of the memory voltage lags behind the real-time voltage in time.

Understandably, when the ignition operation does not occur, the real-time voltage is in a stable state.

Optionally, in a stable state, the memory voltage and the real-time voltage are approximately equal.

Exemplarily, the fluctuation detection unit 721 obtains the real-time voltage from the first input terminal Vin1. When the switch module 41 is continuously in the OFF state, the real-time voltage is approximately equal to the open-circuit voltage of the starting power supply 201. When the switch module 41 is in the ON state, the change in the real-time voltage can reflect the electric potential fluctuation caused by the ignition operation.

Exemplarily, the fluctuation detection unit 721 obtains the real-time voltage from the first output Vout1. When the switch module 41 is continuously in the OFF state and no ignition operation occurs, the real-time voltage is approximately equal to the open-circuit voltage of the load battery 601. The change in the real-time voltage can directly reflect the electric potential fluctuation caused by the ignition operation.

Understandably, when the switch module 41 is in the OFF state, no electrical path is formed between the starting power supply 201 and the load battery 601. At this time, the voltage between the first electrode and the second electrode of the starting power supply 201 is the open-circuit voltage.

Exemplarily, in a stable state, the memory voltage and the real-time voltage are approximately equal to the charging voltage of the load battery 601. It is understandable that when the switch module 41 is in the ON state, an electrical path is formed between the starting power supply 201 and the load battery 601, and the first input terminal Vin1 and the first output Vout1 are in an equipotential state. When no vehicle ignition operation occurs, at this time, the voltage of the first electrode of the load battery 601 is the charging voltage.

For example, in a stable state, there is a small difference between the memory voltage and the real-time voltage, and the difference is less than the fluctuation threshold.

It is understandable that when the ignition operation occurs, the real-time voltage first fluctuates and decreases significantly under the effect of the electrical load 602. As a result, the difference between the memory voltage and the real-time voltage is greater than the fluctuation threshold, and the fluctuation detection unit 721 outputs the ignition detection signal. It is understandable that before the ignition operation ends, as long as the difference between the memory voltage and the real-time voltage is always greater than the fluctuation threshold, the ignition detection signal can continue until the ignition operation ends.

Understandably, when the real-time voltage shows a certain downtrend relative to the open-circuit voltage of the starting power supply 201 or the charging voltage of the load battery 601 within a predetermined time, the fluctuation detection unit 721 outputs an ignition detection signal to the access coupling unit 722, and finally causes the voltage fluctuation detection module 72 to output a starting identification signal.

Exemplarily, during the detection period, when the automobile ignition operation occurs, the voltage fluctuation detection module 72 outputs a starting identification signal. After the starting identification signal appears, the first switch control module 46 changes from triggering the switch module 41 to alternate between the OFF state and the ON state to allowing the switch module 41 to maintain the ON state.

Exemplarily, after the automobile ignition operation ends, the real-time voltage rises to a voltage close to the voltage of the starting power supply 201 or the charging voltage of the load battery 601. At this time, the real-time voltage is equal to the memory voltage. Alternatively, the real-time voltage will first be greater than the memory voltage, and then the memory voltage rises to be equal to the real-time voltage. The voltage fluctuation detection module 72 stops outputting the starting identification signal. If the first output Vout1 and the second output Vout2 still maintain normal conductive contact with the load battery 601 at this time, then the first switch control module 46 resumes alternately timing between the power-on period and the detection period to continuously detect whether the first output Vout1 and the second output Vout2 are correctly connected to the load battery 601.

In some other embodiments, when the switch module 41 can be prevented from being turned on in advance due to the influence of the starting power supply 201 voltage and the voltage fluctuation detection module 72 by corresponding technical means, the access coupling unit 722 can also be omitted, and the fluctuation detection unit 721 directly outputs the starting identification signal.

In some embodiments, as shown in FIGS. 2*a* and 2*b*, the fluctuation detection unit 721 includes a switch element Q11, a diode D4, a capacitor C23 and a fluctuation current limiting branch. One end of the fluctuation current limiting branch is electrically connected to the control end of the switch element Q11, and the other end is electrically connected to the first input terminal or the first output.

In some embodiments, for the first input terminal Vin1 and the first output Vout1, the voltage fluctuation detection module 72 is electrically connected to the first input terminal Vin1, but not directly electrically connected to the first output Vout1. Understandably, when the switch module 41 is in the ON state, the voltage fluctuation detection module 72 can obtain the real-time voltage.

Exemplarily, in combination with FIG. 2*a*, the anode of the diode D4 is electrically connected to the first input terminal Vin1. The capacitor C23 is electrically connected between the cathode of the diode D4 and the ground. The cathode of the diode D4 is further electrically connected to one current-passing end of the switch element Q11. The fluctuation current limiting branch is electrically connected between the control end of the switch element Q11 and the first input terminal Vin1. The other current-passing end of the switch element Q11 is configured to output an ignition detection signal to the access coupling unit 722. Understandably, when the first input terminal Vin1 is electrically connected to the first electrode of the starting power supply 201, the starting power supply 201 applies a voltage to the capacitor C23 through the diode D4, so that the voltage of the capacitor C23 gradually rises to a level close to the voltage of the first electrode of the starting power supply 201.

Understandably, when the ignition operation occurs, the voltage of the first electrode of the starting power supply 201 is pulled down by the electrical load 602. Since the fluctuation current limiting branch is electrically connected between the control end of the switch element Q11 and the first input terminal Vin1 and the capacitor C23 has a voltage clamping function, so the voltage of the control end of the switch element Q11 is lower than the voltage of the capacitor C23, and the two current-passing ends of the switch element Q11 are connected. The other current-passing end of the switch element Q11 outputs an ignition detection signal. The signal form of the ignition detection signal is a high level.

Understandably, the device fluctuation current limiting branch that is connected between the two current-passing ends of the switch element Q11 can also play a current limiting role to avoid damage to the switch element Q11.

Understandably, the voltage of the capacitor C23 is used as a memory voltage, which can reflect the voltage level of the first electrode of the starting power supply 201 before the ignition operation occurs.

Understandably, since the anode of the diode D4 is electrically connected to the first input terminal Vin1, it is not necessary for the switch module 41 to switch to the ON state. The first electrode of the starting power supply 201 can directly charge the capacitor C23 to increase the voltage of the capacitor C23.

Exemplarily, the magnitude of the fluctuation threshold corresponds to a minimum forward bias voltage between a current-passing end and a control end of the switch element Q11.

In some embodiments, for the first input terminal Vin1 and the first output Vout1, the voltage fluctuation detection module 72 is electrically connected to the first output Vout1, but not directly electrically connected to the first input terminal Vin1. It is understandable that after the switch module 41 is switched to the ON state, the voltage fluctuation detection module 72 obtains a real-time voltage corresponding to the charging voltage of the load battery 601.

Exemplarily, in combination with FIG. 2*b*, the anode of the diode D4 can also be electrically connected to the first output Vout1. The fluctuation current limiting branch is electrically connected between the control end of the switch element Q11 and the first output Vout1. Understandably, when the switch module 41 is switched to the ON state and no ignition operation occurs, the starting power supply 201 applies a voltage to the capacitor C23 through the first output Vout1 and the diode D4, so that the voltage of the capacitor C23 rises. If an ignition operation occurs, the voltage of the first output Vout1 is pulled down by the electrical load 602, the two current-passing ends of the switch element Q11 are connected, and the other current-passing end of the switch element Q11 outputs an ignition detection signal.

In some embodiments, the voltage fluctuation detection module 72 is electrically connected to the first output Vout1 and the first input terminal Vin1, respectively. Understandably, when the first output Vout1 and the second output Vout2 are correctly connected to the first electrode and the second electrode of the load battery 601 respectively, before the switch module 41 switches to the ON state, the voltage fluctuation detection module 72 obtains the memory voltage from the first input terminal Vin1, and obtains the real-time voltage from the first output Vout1. The memory voltage corresponds to the open-circuit voltage of the starting power supply 201. Understandably, even if the switch module 41 is in the OFF state, the voltage fluctuation detection module 72 can generate a starting identification signal according to the electric potential fluctuation of the first output Vout1.

For example, in combination with FIG. 5, the anode of the diode D4 can also be electrically connected to the first input terminal Vin1, and the fluctuation current limiting branch is electrically connected between the control end of the switch element Q11 and the first output Vout1 to reduce the dependence on the ON state of the switch module 41. Understandably, in the absence of an ignition operation, the starting power supply 201 applies a voltage to the capacitor C23 directly through the first input terminal Vin1. When the ignition operation occurs, the first output Vout1 directly transmits a low voltage to the control end of the switch element Q11.

In some embodiments, the fluctuation current limiting branch includes a resistor R87, one end of which is electrically connected to the control end of the switch element Q11, and the other end is electrically connected to the first input terminal Vin1 or the first output Vout1. The resistor R87 plays a current limiting role to prevent the switch element Q11 from being damaged.

In some embodiments, in combination with FIG. 2*a* and FIG. 2*b*, the fluctuation current limiting branch includes a resistor R87 and a diode D6. The diode D6 is connected in series with the resistor R87. The unidirectional conduction direction of the diode D6 corresponds to the current outflow direction from the control end of the switch element Q11. Understandably, when the voltage of the first output Vout1 is higher than the voltage of the capacitor C23, the diode D6 can prevent the reverse breakdown between one of the current-passing ends and the control end of the switch element Q11, thereby avoiding damage to the switch element Q11.

Optionally, in combination with FIG. 2*a*, the diode D6 and the resistor R87 are connected in series between the control end of the switch element Q11 and the first input terminal Vin1.

Optionally, in combination with FIG. 2*b*, the diode D6 and the resistor R87 are connected in series between the control end of the switch element Q11 and the first output Vout1.

In some embodiments, in combination with FIG. 2*a* and FIG. 2*b*, the fluctuation detection unit 721 further includes a resistor R15. The resistor R15 is electrically connected between the other current-passing end of the switch element Q11 and the access coupling unit 722. It can be understood that when the two current-passing ends of the switch element Q11 are connected, the resistor R15 plays a current limiting role between the capacitor C23 and the access coupling unit 722, which can prevent the switch element Q11 or the access coupling unit 722 from being damaged due to a large current, and at the same time prolong the discharge time of the capacitor C23, ensuring that the ignition detection signal can be continuously output during the ignition operation.

In some embodiments, in combination with FIG. 5, the access coupling unit 722 includes a switch element Q9, a switch element Q14, a switch element Q23, a resistor R7 and a first voltage divider branch. One current-passing end of the switch element Q9 is configured to receive a connection confirmation signal. The resistor R7 is electrically connected between one current-passing end of the switch element Q9 and the control end of the switch element Q9. One current-passing end of the switch element Q14 is electrically connected to the control end of the switch element Q9, and the other current-passing end is grounded. The control end of the switch element Q14 is configured to receive the ignition detection signal. The first voltage divider branch is electrically connected between the other current-passing end of the switch element Q9 and the ground. The middle node of the first voltage divider branch is electrically connected to the control end of the switch element Q23. One current-passing end of the switch element Q23 is configured to output the starting identification signal, and the other current-passing end is grounded.

Understandably, in the case the signal form of the connection confirmation signal is a high level, when the switch element Q9 receives the connection confirmation signal and the switch element Q14 is turned on between the two current-passing ends under the triggering of the ignition detection signal, the voltage of the control end of the switch element Q9 is lower than the voltage of one current-passing end of the switch element Q9, so that it is turned on between the two current-passing ends of the switch element Q9. The middle node of the first voltage divider branch provides a bias voltage to the control end of the switch element Q23, so that it is turned on between the two current-passing ends of the switch element Q23, thereby outputting a starting identification signal in the form of a low level.

Exemplarily, one current-passing end of the switch element Q23 is configured to output a starting identification signal to the first switch control module 46. The signal form of the starting identification signal is a low level.

Exemplarily, one current-passing end of the switch element Q9 is electrically connected to at least one of the second access detection module 71 and the first access detection module 47 to receive the connection confirmation signal.

In some embodiments, in combination with FIG. 6, the switch module 41 includes a switch element K1 and a switch driving unit 411 electrically connected to the control end of the switch element K1. Optionally, the switch element K1 is configured to be electrically connected between the first input terminal Vin1 and the first output Vout1. Optionally, the switch element K1 is configured to be electrically connected between the second input terminal Vin2 and the second output Vout2. The first switch control module 46 or the voltage detection module 44 controls the ON/OFF switching of the switch element K1 through the switch driving unit 411. Specifically, the output end of the switch driving unit 411 is electrically connected to the control end of the switch element K1.

Exemplarily, the overload detection module 81 controls the ON/OFF switching of the switch element K1 through the switch driving unit 411.

Specifically, the switch element K1 can be selected from relays, MOS tubes or other devices that can be configured to implement the switch function. Exemplarily, one of a pair of normally open contacts of the switch element K1 is electrically connected to the first input terminal Vin1, and the other is electrically connected to the first output Vout1. It can be understood that when turned on, the switch element K1 can be regarded as a conductor with extremely low resistance, so the first electrode of the starting power supply 201 can be directly electrically connected to the first output Vout1. Understandably, when the switch element K1 is turned on, the real-time voltage corresponds to the voltage at any position between the first input terminal Vin1 and the first output Vout1. Therefore, the voltage fluctuation detection module 72 detects the voltage change at a certain position in the circuit, rather than the voltage difference across the switch element K1.

Exemplarily, in combination with FIG. 4*a* and FIG. 5, when the first output Vout1 and the second output Vout2 are respectively correctly connected to the load battery 601 and the switch element K1 is turned on, the voltage fluctuation detection module 72 will detect that the voltage value is 14V, that is, the output voltage of the starting power supply 201.

If the user does not start the engine, the voltage value will remain unchanged. The voltage fluctuation detection module 72 will not send a starting identification signal to the first switch control module 46, and the switch element K1 will be alternately turned on and turned off. Exemplarily, the switch element K1 may be turned on for 5 seconds, then turned off for 20 milliseconds, and then turned on for 5 seconds, and so on.

If the user starts the engine during this period, the current in the circuit will increase significantly, and the voltage value detected by the voltage fluctuation detection module 72 at the switch element K1 may drop to 13V. Due to the change in voltage, the voltage fluctuation detection module 72 will send a starting identification signal to the first switch control module 46. The first switch control module 46 triggers the switch driving unit 411 according to the starting identification signal. The switch driving unit 411 keeps the switch element K1 in the ON state until the detected voltage value rises or the voltage value remains unchanged permanently.

Specifically, as shown in FIG. 6, one end of the coil of the switch element K1 is electrically connected to the first input terminal Vin1, and the other end is electrically connected to the switch driving unit 411. More specifically, when the switch driving unit 411 inputs a low voltage to the other end of the coil of the switch element K1, then the current passes through the coil of the switch element K1, a pair of normally open contacts of the switch element K1 are closed, and the switch module 41 is in the ON state, so that an electrical path is formed between the electrodes of the starting power supply 201 and the electrodes of the load battery 601. When a high voltage is input to the other end of the coil of the switch element K1, then no current passes through the coil of the switch element K1, a pair of normally open contacts of the switch element K1 are open, and the switch module 41 is in the OFF state.

In some embodiments, a diode D3 is electrically connected between the two ends of the coil of the switch element K1. The cathode of the diode D3 is electrically connected to the positive electrode of the starting power supply 201, and the anode of the diode D3 is electrically connected to the switch driving unit 411, so that the back electromotive force (EMF) of the coil can be released through the diode D3.

In some embodiments, the switch driving unit 411 is provided with a time control terminal, and the level state of the time control terminal includes a valid level and an invalid level. When the time control terminal is at a valid level, the switch driving unit 411 controls the switch element K1 to be turned on, and when the time control terminal is at an invalid level, the switch driving unit 411 controls the switch element K1 to be turned off. Optionally, the valid level is a high level, and the invalid level is a low level. Optionally, the valid level is a low level, and the invalid level is a high level.

Specifically, the level state of the time control terminal is at least controlled by the first switch control module 46. More specifically, the output end of the first switch control module 46 is electrically connected to the time control terminal. In some embodiments, in the ready state, the first switch control module 46 outputs a valid level to the time control terminal during the power-on period, and outputs an invalid level to the time control terminal during the detection period.

Further, the level state of the time control terminal is also controlled by the output end of the second switch control module 48. More specifically, the level state of the time control terminal is controlled by the first switch control module 46 and the second switch control module 48 at the same time. Any one of the first switch control module 46 and the second switch control module 48 can lock the time control terminal at the invalid level. Understandably, in the case the time control terminal is not short-circuited with the reference voltage point and the invalid level is a low level, when any one of the first switch control module 46 and the second switch control module 48 outputs a low level, the time control terminal can be clamped at the invalid level.

Specifically, the output end of the second switch control module 48 is electrically connected to the time control terminal. Before the time period defined by the enabled timing ends, the second switch control module 48 outputs a high level to the time control terminal. After the time period defined by the enabled timing ends, the second switch control module 48 outputs a low level to the time control terminal, thereby ensuring that it is in the disconnected state between the first input terminal Vin1 and the first output Vout1 when the time period defined by the enabled timing ends.

In some embodiments, in combination with FIG. 6, the switch driving unit 411 is further provided with a stop control terminal for receiving a stop signal. Specifically, in the case where the stop signal is not received, before the time period defined by the enabled timing ends, during the power-on period, the first switch control module 46 outputs a valid level to the time control terminal, so that the first electrode of the starting power supply 201 can transfer current to the first output Vout1. During the detection period, the first switch control module 46 outputs an invalid level to the time control terminal, so that it is in the disconnected state between the first output Vout1 and the first electrode of the starting power supply 201, so that it can be determined whether the first output Vout1 or the second output Vout2 is removed from the electrodes of the load battery 601.

Understandably, in the case that the stop signal is not received, when the time control terminal is at a valid level, the switch driving unit 411 controls the switch element K1 to be turned on. When the time control terminal is at an invalid level, the switch driving unit 411 controls the switch element K1 to be turned off. In the case that the stop signal is received, regardless of whether or not the first switch control module 46 is in a ready state, the switch driving unit 411 controls the switch element K1 to be turned off, so as to stop the current transmission between the starting power supply 201 and the load battery 601 in time, avoiding damage to the starting power supply 201, the jump start circuit 400 or the load battery 601.

In some embodiments, as shown in FIG. 6, the switch driving unit 411 includes a switch element Q6 and a resistor R12. One current-through end of the switch element Q6 is electrically connected to the control end of the switch element K1, and the other current-through end of the switch element Q6 is grounded. The resistor R12 is electrically connected between the control end of the switch element Q6 and the ground. Specifically, the control end of the switch element Q6 is as the time control terminal, electrically connected to the first switch control module 46. More specifically, during the power-on period, the valid level acts on the control end of the switch element Q6 to turn on the switch element Q6. There is an electric potential difference between the two ends of the coil of the switch element K1, thereby actuating the normally open contacts of the switch element K1 to close. During the detection period, the invalid level acts on the control end of the switch element Q6 to turn off the switch element Q6. There is no electric potential difference between the two ends of the coil of the switch element K1, and the normally open contacts of the switch element K1 are open.

In some embodiments, when the switch module 41 is controlled by both the first switch control module 46 and the second switch control module 48 at the same time, the control end of the switch element Q6 is electrically connected to the first switch control module 46 and the second switch control module 48 respectively.

In some embodiments, in combination with FIG. 6, the switch driving unit 411 further includes a switch element Q7 and a resistor R11. The control end of the switch element Q6 is electrically connected to a current-passing end of the switch element Q7. The other current-passing end of the switch element Q7 is grounded. The resistor R11 is electrically connected between the control end of the switch element Q7 and the output end of the voltage detection module 44. Specifically, the resistor R11 is configured to be electrically connected to one end of the voltage detection module 44 as a stop control terminal. Specifically, the stop control terminal can also be electrically connected to the output end of the temperature detection module 45.

Optionally, the resistor R11 is electrically connected between the control end of the switch element Q7 and the overload detection module 81.

Specifically, when the stop signal is in the form of a high level, the switch element Q7 is turned ON under the control of the stop signal. The control end of the switch element Q6 is clamped at a low level, and the switch element Q6 is in an OFF state, so that the switch element K1 is in an OFF state.

In some other embodiments, when the switch module 41 is controlled only by the overload detection module 81, the control end of the switch element Q6 can be electrically connected to a high level through a pull-up resistor.

In some embodiments, in combination with FIG. 6, the switch module 41 further includes a resistor R70. The resistor R70 is configured to be electrically connected between the first output Vout1 and the second output Vout2. Specifically, the resistor R70 is electrically connected between the other one of a pair of normally open contacts of the switch element K1 and the ground.

In some embodiments, in combination with FIG. **4*a* and FIG. 5, the first switch control module 46 includes a timing management chip U4. The timing management chip U4 is provided with a first level locking terminal, a second level locking terminal and an output terminal. The first level locking terminal and the second level locking terminal are electrically connected to the voltage fluctuation detection module 72 to receive the starting identification signal. When receiving the starting identification signal, the output terminal continuously outputs a valid level to the switch module 41, and the valid level is configured to trigger the switch module 41 to switch to the ON state. Understandably, when the first level locking terminal and the second level locking terminal do not receive the starting identification signal, the output terminal of the timing management chip U4 alternately outputs a valid level and an invalid level to the switch module 41. Among them, the valid level is configured to trigger the switch module 41 to switch to the ON state, and the invalid level is configured to trigger the switch module 41 to switch to the OFF state. When the first level locking terminal receives the starting identification signal, the output terminal continuously outputs a valid level to the switch module 41, so that when the ignition operation occurs, the switch module 41** is continuously kept in the ON state.

Understandably, by adjusting the output of the first switch control module 46, the switch module 41 is kept in the ON state. This avoids the need for the switch module 41 to make responses with different priorities to the first switch control module 46 and the voltage fluctuation detection module 72, which is beneficial to simplifying the control logic or circuit structure of the switch module 41.

Exemplarily, the timing management chip U4 adopts the NE555 timing chip. In the case that the timing management chip U4 is powered on, when the voltage of the first level locking terminal is lower than a certain voltage, the output terminal will output a valid level. When the voltage of the second level locking terminal is higher than a specified voltage, the output terminal will output an invalid level. When the voltage of the first level locking terminal is not lower than the certain voltage and the voltage of the second level locking terminal is not higher than the specified voltage, the output terminal alternately outputs a valid level and an invalid level to the switch module 41.

In some embodiments, as shown in FIG. 5, the first switch control module 46 further includes a resistor R27, a capacitor C17 and a diode D19. The timing management chip U4 is provided with a fourth terminal, a seventh terminal and an eighth terminal. The eighth terminal of the timing management chip U4 is configured to receive a connection confirmation signal and is electrically connected to the fourth terminal. The resistor R27 is electrically connected between the fourth terminal and the seventh terminal of the timing management chip U4. The anode of the diode D19 is electrically connected to the seventh terminal of the timing management chip U4. The first level locking terminal of the timing management chip U4 is electrically connected to the voltage fluctuation detection module 72 and is configured to receive the starting identification signal. The first level locking terminal of the timing management chip U4 is further electrically connected to the second level locking terminal and the cathode of the diode D19, respectively. The capacitor C17 is electrically connected between the first level locking terminal of the timing management chip U4 and the ground.

Understandably, when the eighth terminal of the timing management chip U4 receives the connection confirmation signal, the timing management chip U4 obtains power supply from the connection confirmation signal in the form of a high level. Thereafter, when the first level locking terminal of the timing management chip U4 does not receive the starting identification signal, the timing management chip U4 alternately timings the power-on period and the detection period in time, and triggers the switch module 41 to switch to the ON state during the power-on period.

Understandably, when the eighth terminal of the timing management chip U4 receives a connection confirmation signal and the first level locking terminal receives a starting identification signal, the timing management chip U4 triggers the switch module 41 to remain continuously in the ON state.

In some embodiments, in combination with FIG. 5, the first switch control module 46 further includes a resistor R16, a resistor R41, a resistor R61, a capacitor C8, a capacitor C16, a diode D10, and a diode D20. Specifically, the timing management chip U4 is further provided with a first terminal, an output terminal, and a fifth terminal. In some embodiments, the timing management chip U4 is a NE555 timing chip.

In some embodiments, when the voltage of the first output Vout1 is greater than the first voltage threshold, the first access detection module 47 is in an ON state between the reference voltage point and the timing management chip U4. The reference voltage is configured to power up the timing management chip U4, so that the timing management chip U4 starts to run.

In some embodiments, when the voltage of the first output Vout1 is greater than the first voltage threshold, the first access detection module 47 outputs a connection confirmation signal to the fourth terminal of the timing management chip U4.

Specifically, the first terminal of the timing management chip U4 is grounded. Capacitor C8 is electrically connected between the fifth terminal of the timing management chip U4 and the ground. The anode of the diode D20 is electrically connected to the first level locking terminal. Resistor R16 is electrically connected between the cathode of the diode D20 and the seventh terminal. Resistor R61 and capacitor C16 are connected in parallel between the fourth terminal and the ground. The fourth terminal is electrically connected to the first access detection module 47. Resistor R41 is electrically connected between the output terminal and the switch module 41. The cathode of the diode D10 is electrically connected to the output terminal, and the anode of the diode D10 is electrically connected to the switch module 41.

More specifically, resistor R41 is electrically connected between the output terminal of the timing management chip U4 and the time control terminal of the switch driving unit 411. The cathode of the diode D10 is electrically connected to the output terminal of the timing management chip U4, and the anode of the diode D10 is electrically connected to the time control terminal of the switch driving unit 411. When starting operation, the output terminal of the timing management chip U4 switches the time control terminal of the switch driving unit 411 between the valid level and the invalid level through the resistor R41 and the diode D10.

Exemplarily, the eighth terminal is configured to power up the internal circuit of the timing management chip U4. The seventh terminal is configured to discharge the capacitor in the internal circuit. The fifth terminal is configured to control the threshold voltage in the internal circuit. The fourth terminal is configured to reset the timing management chip U4 by grounding. The internal circuit of the timing management chip U4 is grounded through the first terminal.

In some other embodiments, the first access detection module 47 can also be configured to output a short-time pulse signal that can wake up the timing management chip U4.

In some other embodiments, when the voltage of the first output Vout1 is greater than the first voltage threshold, the first access detection module 47 outputs a connection confirmation signal to the first switch control module 46, and the signal form of the connection confirmation signal is a low level.

In some embodiments, in combination with FIG. 4*a* and FIG. 7, an input end of the first access detection module 47 is electrically connected to the first output Vout1. The first output Vout1 is configured to electrically connect to the first electrode of the load battery 601.

Exemplarily, the output end of the first access detection module 47 is configured to output a connection confirmation signal to the first switch control module 46 and the second switch control module 48. Optionally, the first access detection module 47 is further electrically connected to the reference voltage point.

In some embodiments, as shown in FIG. 7, the first access detection module 47 includes a switch element Q16 and an access driving unit 471. The switch element Q16 is electrically connected between the reference voltage point and the first switch control module 46. The access driving unit 471 is electrically connected to the control end of the switch element Q16, and the access driving unit 471 is further configured to electrically connect between the first output Vout1 and the second output Vout2. When the voltage at the first output Vout1 is greater than the first voltage threshold, the access driving unit 471 is configured to trigger the switch element Q16 to turn on, so that the first access detection module 47 is in an ON state between the reference voltage point and the first switch control module 46. The first switch control module 46 obtains power supply and maintains in a ready state.

Specifically, the access driving unit 471 is electrically connected to the first output Vout1, so that the voltage of the first output Vout1 is transmitted to the access driving unit 471. One current-passing end of the switch element Q16 is electrically connected to the reference voltage point, and the other current-passing end is electrically connected to the first switch control module 46. Specifically, as shown in FIG. 7, the first access detection module 47 further includes a resistor R42, which is electrically connected between the reference voltage point and the control end of the switch element Q16, so as to eliminate the bias voltage of the control end of the switch element Q16 when the access driving unit 471 does not generate a triggering effect.

Further, in combination with FIG. 7 and FIG. 9, the control end of the switch element Q16 is further electrically connected to the forced starting module 73. When manually controlled, the forced starting module 73 turns on the switch element Q16, thereby triggering the first switch control module 46 to switch to the ready state.

In some embodiments, in combination with FIG. 7, the access driving unit 471 includes a second voltage divider branch and a switch element Q10. The second voltage divider branch is configured to electrically connect between the first output Vout1 and the second output Vout2. The middle node of the second voltage divider branch is electrically connected to the control end of the switch element Q10. One of the current-passing ends of the switch element Q10 is electrically connected to the control end of the switch element Q16, and the other current-passing end is grounded. Specifically, when the first output Vout1 and the second output Vout2 are electrically connected to the first electrode and the second electrode of the load battery 601 respectively, the control end of the switch element Q10 is electrically connected to the middle node of the second voltage divider branch, and the second voltage divider branch plays a role in reducing the voltage of the load battery 601, so that the voltage of the first output Vout1 is reduced by a certain proportion and then transmitted to the control end of the switch element Q16. In this way, when the first output Vout1 and the second output Vout2 are in normal contact with the electrodes of the load battery 601, the switch element Q10 is in an ON state and transmits a low level to the control end of the switch element Q16, triggering the switch element Q16 to turn on.

Specifically, in combination with FIG. 7, the second voltage divider branch includes a resistor R49 and a resistor R51 connected in series between the first output Vout1 and the second output Vout2. The connection node between the resistor R49 and the resistor R51 is electrically connected to the control end of the switch element Q10.

In some embodiments, in combination with FIG. 7, the first access detection module 47 further includes an anti-short circuit unit 472. The other current-passing end of the switch element Q16 is electrically connected to the first switch control module 46 and the anti-short circuit unit 472. When the voltage of the first output Vout1 is greater than the first voltage threshold, the access driving unit 471 is configured to trigger the switch element Q16 to turn on. Relative to the time point when the voltage of the first output Vout1 drops below the first voltage threshold, the turn-on trigger signal to the switch element Q16 from the access driving unit 471 is eliminated after the window period. The anti-short circuit unit 472 is electrically connected to the second access detection module 71 and the control end of the switch element Q16, respectively. When the switch element Q16 is in the ON state and the anti-short circuit unit 472 is triggered by the second access detection module 71, the anti-short circuit unit 472 triggers the switch element Q16 to remain in the ON state. Specifically, before the first output Vout1 and the second output Vout2 are correctly connected to the first electrode and the second electrode of the load battery 601 respectively, in order to prevent the first output Vout1 and the second output Vout2 from being short-circuited, the second access detection module 71 triggers the first switch control module 46 through the anti-short circuit unit 472. Before the voltage of the first output Vout1 is greater than the first voltage threshold, the anti-short circuit unit 472 will not trigger the switch element Q16 to turn on under the action of the second access detection module 71, so as to prevent the voltage of the starting power supply 201 from being directly applied between the first output Vout1 and the second output Vout2 when the first output Vout1 and the second output Vout2 are short-circuited, thereby avoiding the occurrence of a short circuit. In the case that voltage of the first output Vout1 is greater than the first voltage threshold and after the voltage of the first output Vout1 drops below the first voltage threshold, since the turn-on trigger signal of the access driving unit 471 to the switch element Q16 is eliminated after the window period, the switch element Q16 continues to be in the ON state during the window period. When the second access detection module 71 triggers the first switch control module 46 to maintain the ready state during the window period, the anti-short circuit unit 472 triggers the switch element Q16 to maintain the ON state during and after the window period, until the triggering effect of the second access detection module 71 disappears.

Specifically, during the window period, when a resistive access signal is transmitted to the anti-short circuit unit 472, the anti-short circuit unit 472 triggers the switch element Q16 to maintain the ON state.

In some embodiments, as shown in FIG. 7, the access driving unit 471 further includes a delay branch, which is electrically connected between the control end of the switch element Q10 and the ground, thereby reducing the voltage change speed of the control end of the switch element Q16. Specifically, at first the first output Vout1 and the second output Vout2 are in normal contact with the electrodes of the load battery 601, but later at least one of the first output Vout1 and the second output Vout2 is removed from the electrode of the load battery 601, due to the delay effect of the delay branch, the voltage of the control end of the switch element Q10 is lower than the minimum trigger voltage of the control end of the switch element Q10 only after the window period. So, the switch element Q10 remains being turned on in the window period after the voltage of the first output Vout1 drops below the first voltage threshold. The switch element Q10 outputs a low-level turn-on trigger signal to the switch element Q16 in the window period, so that the turn-on trigger signal of the access driving unit 471 to the switch element Q16 is eliminated only after the window period.

Specifically, the delay branch includes a capacitor C19, and the capacitor C19 is electrically connected between the control end of the switch element Q10 and the ground.

In some embodiments, in combination with FIG. 7, the anti-short circuit unit 472 includes a switch element Q12, a switch element Q17, a first current limiting branch, and a third voltage divider branch. The third voltage divider branch is electrically connected between the output end of the second access detection module 71 and the ground. The middle node of the third voltage divider branch is electrically connected to the control end of the switch element Q17. The first current limiting branch is electrically connected between one current-passing end of the switch element Q17 and another current-passing end of the switch element Q16. One current-passing end of the switch element Q17 is further electrically connected to the control end of the switch element Q12. The other current-passing end of the switch element Q17 is grounded. One current-passing end of the switch element Q12 is electrically connected to the control end of the switch element Q16, and the other current-passing end is grounded. Specifically, the signal form of the resistive access signal is a low level. When the resistive access signal is applied to the third voltage divider branch, the middle node of the third voltage divider branch applies a low level to the control end of the switch element Q17, so that the switch element Q17 remains turned off. When the switch element Q17 is turned off, the control end of the switch element Q12 is isolated from the ground. When the switch element Q16 is in the window period, the reference voltage is transmitted to the control end of the switch element Q12, so that the switch element Q12 is turned on. When the switch element Q12 remains turned on, the switch element Q16 can continue to remain turned on and is no longer restricted by the window period, until the resistive access signal disappears.

Further, when the detection voltage rises to not less than the second voltage threshold, after the resistive access signal disappears, the second access detection module 71 applies a high level to one end of the third voltage divider branch, and the control end of the switch element Q12 is clamped at a low level by the switch element Q17, so that the switch element Q12 is resumed to be turned off. However, since accordingly the voltage of the first output Vout1 rises to a value greater than the first voltage threshold, the access driving unit 471 resumes the triggering to the switch element Q16, so that the switch element Q16 can remain turned on, allowing the first switch control module 46 to continue to maintain the ready state.

Specifically, as shown in FIG. 7, the first current limiting branch includes a resistor R52, and the resistor R52 is electrically connected between one current-passing end of the switch element Q17 and the other current-passing end of the switch element Q16. The third voltage divider branch includes a resistor R53 and a resistor R55, and the resistor R53 and the resistor R55 are connected in series between the output end of the second access detection module 71 and the ground. The connection node between the resistor R53 and the resistor R55 is electrically connected to the control end of the switch element Q17.

In some other embodiments, for the time point when the voltage of the first output Vout1 drops to be equal to the first voltage threshold, through the effect of the delay branch, the connection confirmation signal disappears after the window period relative to the time point.

Further, the first access detection module 47 can also output the connection confirmation signal to the first switch control module 46 and the second switch control module 48 at the same time. In this embodiment, the signal form of the connection confirmation signal is a high level. In other embodiments, the signal form of the connection confirmation signal can also be a low level.

In some embodiments, in combination with FIG. 7, the second access detection module 71 includes a first resistive branch, a second resistive branch and a first determining unit 711. The first resistive branch is configured to electrically connect between the first output Vout1 and the second output Vout2. The second resistive branch is connected in series with the first resistive branch between the reference voltage point and the ground. The connection node between the first resistive branch and the second resistive branch is electrically connected to the first determining unit 711 and is configured to output the detection voltage. When the voltage at one end of the first resistive branch is less than the second voltage threshold, the first determining unit 711 is configured to trigger the first switch control module 46 to maintain in a ready state. Specifically, a series connection relationship is formed between the second resistive branch and the first resistive branch, and the reference voltage is distributed between the second resistive branch and the first resistive branch. One end of the first resistive branch is electrically connected to the first output Vout1, and the other end is electrically connected to the second output Vout2. When the first output Vout1 and the second output Vout2 are correctly connected to the two electrodes of the load battery 601 respectively, the internal resistance of the load battery 601 forms a parallel connection relationship with the first resistive branch. Compared with the situation where the first resistive branch is not connected in parallel with the internal resistance of the load battery 601, after the first resistive branch is connected in parallel with the internal resistance of the load battery 601, the distribution ratio of the reference voltage at two ends of the first resistive branch decreases, so that the voltage at one end of the first resistive branch is less than the second voltage threshold. After identifying that the voltage at one end of the first resistive branch is less than the second voltage threshold, the first determining unit 711 triggers the first switch control module 46 to maintain the ready state. Specifically, the voltage at one end of the first resistive branch can be understood as the detection voltage.

In some embodiments, in combination with FIG. 7, when the detection voltage is less than the second voltage threshold, the first determining unit 711 is configured to output a resistive access signal to the first access detection module 47. Specifically, the signal form of the resistive access signal is a low level.

In some other embodiments, when the detection voltage is less than the second voltage threshold, the first determining unit 711 is configured to output a resistive access signal to the first switch control module 46.

Specifically, the second access detection module 71 outputs a detection voltage to a position between the first output Vout1 and the second output Vout2 at least during the detection period and when the voltage of the first output Vout1 is less than the first voltage threshold. More specifically, in combination with FIG. 7, the second access detection module 71 further includes a diode D16. The anode of the diode D16 is electrically connected to the connection node between the first resistive branch and the second resistive branch, and the cathode of the diode D16 is configured to be electrically connected to the first output Vout1. When the vehicle ignition operation does not occur, the diode D16 can limit the voltage of the load battery 601 from inputting into the second access detection module 71.

In some embodiments, the first resistive branch is a branch in which a plurality of resistors are connected in series or in parallel.

In some embodiments, the second resistive branch is a branch in which a plurality of resistors are connected in series or in parallel.

In some embodiments, as shown in FIG. 7, the first resistive branch includes a resistor R37, and the second resistive branch includes a resistor R36. The resistor R36 and the resistor R37 are connected in series between the reference voltage point and the ground. The connection node between the resistor R36 and the resistor R37 is electrically connected to the first determining unit 711.

In some embodiments, as shown in FIG. 7, the first determining unit 711 includes a comparator U7 and a fourth voltage divider branch. The connection node between the first resistive branch and the second resistive branch is electrically connected to a non-inverting input terminal of the comparator U7. The fourth voltage divider branch is electrically connected between the reference voltage point and the ground, and the middle node of the fourth voltage divider branch is electrically connected to an inverting input terminal of the comparator U7. The output terminal of the comparator U7 is configured to trigger the first switch control module 46 to maintain a ready state. Specifically, the fourth voltage divider branch inputs a certain voltage to the inverting input terminal of the comparator U7 by voltage division, and the amplitude of said voltage corresponds to the second voltage threshold. When the first resistive branch is not connected in parallel with the internal resistance of the load battery 601, the voltage at the non-inverting input terminal of the comparator U7 is not higher than the voltage at the inverting input terminal, and the comparator U7 outputs a high level. After the first resistive branch is connected in parallel with the internal resistance of the load battery 601, the voltage at the non-inverting input terminal of the comparator U7 is lower than the voltage at the inverting input terminal of the comparator U7, and the comparator U7 outputs a low level, which serves as a resistive access signal to trigger the first switch control module 46 to maintain in a ready state.

Specifically, the output terminal of the comparator U7 can be electrically connected to the first access detection module 47, or can be electrically connected to the first switch control module 46.

Specifically, in combination with FIG. 7, the fourth voltage divider branch includes a resistor R29 and a resistor R39. The resistor R29 and the resistor R39 are connected in series between the reference voltage point and the ground. The connection node between the resistor R29 and the resistor R39 is electrically connected to the inverting input terminal of the comparator U7.

Specifically, as shown in FIG. 7, the first determining unit 711 further includes a resistor R3. One end of the resistor R3 is electrically connected to the connection node between the first resistive branch and the second resistive branch, and the other end is electrically connected to the non-inverting input terminal of the comparator U7, thereby limiting the input current of the non-inverting input terminal of the comparator U7.

Specifically, in combination with FIG. 7, the first determining unit 711 further includes a capacitor C14, which is electrically connected between the inverting input terminal of the comparator U7 and the ground, thereby improving the voltage stability of the inverting input terminal of the comparator U7 and reducing voltage fluctuations.

In some embodiments, in combination with FIG. 9, the forced starting module 73 includes a switch element Q13, a control unit 731, and a delay voltage divider unit 732. One of the current-passing ends of the switch element Q13 is grounded, and the other current-passing end is configured to, in the ON state, trigger the first switch control module 46 to switch to the ready state. The delay voltage divider unit 732 is electrically connected between the control end of the switch element Q13 and the control unit 731. When manually controlled, the control unit 731 can send an activation signal. When the duration of the activation signal is not less than a predetermined period of time, the delay voltage divider unit 732 triggers the switch element Q13 to turn on.

Specifically, when the switch element Q13 is in the ON state, the other current-passing end of the switch element Q13 transmits a low level to the first access detection module 47, so the first access detection module 47 is in the ON state between the reference voltage point and the first switch control module 46, so that the first switch control module 46 obtains power supply.

Specifically, when the switch element Q13 is in the ON state, it can also be that the other current-passing end of the switch element Q13 transmits a low level to the first switch control module 46, so that the first switch control module 46 is triggered to enter the ready state. Alternatively, the low level of the other current-passing end of the switch element Q13 allows the first switch control module 46 to be internally turned on, and the working current flows into it.

In some embodiments, as shown in FIG. 9, the forced starting module 73 further includes a locking unit 733 for electrically connecting between the reference voltage point and the control end of the switch element Q13. The locking unit 733 has an ON state and an OFF state between the reference voltage point and the control end of the switch element Q13. When the other current-passing end of the switch element Q13 in the ON state triggers the first switch control module 46 to switch to the ready state, it also triggers the locking unit 733 to switch to the ON state. Specifically, when the control end of the switch element Q13 is at a high level, the switch element Q13 is turned on. In the ON state, the other current-passing end of the switch element Q13 triggers, with a low level, the first switch control module 46 to enter the ready state. The other current-passing end of the switch element Q13 also triggers, with a low level, the locking unit 733, so that the locking unit 733 is in an ON state between the reference voltage point and the control end of the switch element Q13. The reference voltage is transmitted to the control end of the switch element Q13 through the locking unit 733. Therefore, after the manual control action stops, the other current-passing end of the switch element Q13 can continue to trigger, with a low level, the first switch control module 46, so that the first switch control module 46 is maintained in the ready state.

In some embodiments, as shown in FIG. 9, the control unit 731 includes a switch element Q15, a resistor R48, a resistor R62, and a button SW1. One of the current-passing ends of the switch element Q15 is electrically connected to the reference voltage point. The resistor R62 is electrically connected between the other current-passing end of the switch element Q15 and the ground. The other current-passing end of the switch element Q15 is electrically connected to the delay voltage divider unit 732. The resistor R48 is electrically connected between one of the current-passing ends of the switch element Q15 and the control end of the switch element Q15. The button SW1 has a pair of normally open contacts, one of which is electrically connected to the control end of the switch element Q15, and the other is grounded. Specifically, when the button SW1 is pressed, the two normally open contacts of the button SW1 are connected. The control end of the switch element Q15 is pulled down to a low level, and the switch element Q15 is turned on, so that the reference voltage level is transmitted to the other current-passing end of the switch element Q15, accordingly the control unit 731 can use the high level to trigger the delay voltage divider unit 732.

In some embodiments, as shown in FIG. 9, the delay voltage divider unit 732 includes a resistor R59, a resistor R60, a resistor R67, and a capacitor C24. The resistor R59, the resistor R60, and the resistor R67 are sequentially connected in series between the output end of the control unit 731 and the ground. The connection node between the resistor R60 and the resistor R67 is electrically connected to the control end of the switch element Q13. One end of the capacitor C24 is electrically connected to the connection node between the resistor R59 and the resistor R60, and the other end is grounded. Specifically, when the output end of the control unit 731 outputs a high level, the resistor R59, the resistor R60, and the resistor R67 play a role of series connection voltage reduction to output a suitable bias voltage to the control end of the switch element Q13. The resistor R59 plays a role of current limiting to control the voltage rise time of the capacitor C24. Specifically, since the resistor R60 and the resistor R67 are connected in series and then connected in parallel with the capacitor C24, the control end of the switch element Q13 is clamped by the capacitor C24. After the button SW1 is pressed, the switch element Q13 needs to wait for the capacitor C24 to charge for a certain period of time before it can be turned on. Therefore, the button SW1 needs to be pressed continuously for a certain period of time before the switch element Q13 switches to the ON state, thereby preventing the switch element Q13 from responding when the button SW1 is accidentally pressed.

Further, in combination with FIG. 9, the delay voltage divider unit 732 further includes a diode D24. The diode D24 is arranged in parallel with the resistor R59. The cathode of the diode D24 is electrically connected to the output end of the control unit 731. Specifically, after the locking unit 733 locks the ON state of the switch element Q13, the charge on the capacitor C24 can be released through the resistor R60 and the resistor R67, or can be released through the diode D24 and the control unit 731.

In some embodiments, in combination with FIG. 9, the forced starting module 73 further includes a diode D37. The cathode of the diode D37 is electrically connected to the other current-passing end of the switch element Q13. The anode of the diode D37 is electrically connected to the first access detection module 47. More specifically, the anode of the diode D37 is electrically connected to the control end of the switch element Q16.

In some embodiments, in combination with FIG. 9, the forced starting module 73 further includes a diode D15. The anode of the diode D15 is electrically connected to the connection node between the resistor R59 and the resistor R60, and the cathode is electrically connected to the output end of the second access detection module 71. Specifically, when the second access detection module 71 outputs a resistive access signal in the form of a low level, the voltage across the capacitor C24 is clamped at a low level, thereby limiting the control unit 731 from charging the capacitor C24 and limiting the delay voltage divider unit 732 from triggering the switch element Q13 to turn on. Thus, it inhibits the forced starting module 73 from triggering the first switch control module 46 and prevents the first switch control module 46 from entering the ready state in the case of a short circuit.

In some embodiments, as shown in FIG. 9, the forced starting module 73 further includes a diode D14. The anode of the diode D14 is electrically connected to the connection node between the resistor R59 and the resistor R60, and the cathode is electrically connected to the anti-reverse connection module 74. Specifically, when there is a reverse voltage between the first output Vout1 and the second output Vout2, the anti-reverse connection module 74 transmits a low level to the cathode of the diode D14, and the voltage across the capacitor C24 is clamped at a low level, thereby limiting the control unit 731 from charging the capacitor C24, and limiting the delay voltage divider unit 732 from triggering the switch element Q13 to turn on. Therefore, it prevents the forced starting module 73 from triggering the first switch control module 46 to enter the ready state when the first output Vout1 and the second output Vout2 are reversely connected to the load battery 601.

In some embodiments, as shown in FIG. 9, the forced starting module 73 further includes a diode D16. The anode of the diode D16 is electrically connected to the control end of the switch element Q13, and the cathode is electrically connected to the second switch control module 48. Specifically, after the time period defined by the enabled timing ends, the second switch control module 48 outputs a low level to the cathode of the diode D16, so that the control end of the switch element Q13 is clamped at a low level. The switch element Q13 switches to an OFF state, thereby preventing the forced starting module 73 from causing the starting power supply 201 to discharge to the load battery 601 for a long time, reducing the power loss of the starting power supply 201 and avoiding overheating of the starting power supply 201.

In some embodiments, as shown in FIG. 9, the anti-reverse connection module 74 includes a resistor R35 and an optocoupler IC2. The primary side of the optocoupler IC2 is provided with an anode and a cathode, and the secondary side of the optocoupler IC2 is provided with a collector and an emitter. The resistor R35 is electrically connected between the anode of the optocoupler IC2 and the ground. The cathode of the optocoupler IC2 is electrically connected to the first output Vout1. The collector of the optocoupler IC2 is electrically connected to the delay voltage divider unit 732. More specifically, the collector of the optocoupler IC2 is electrically connected to the cathode of the diode D14, and the anode of the diode D14 is electrically connected to the delay voltage divider unit 732. The emitter of the optocoupler IC2 is grounded. Specifically, when the first output Vout1 is electrically connected to the second electrode of the load battery 601, and the second output Vout2 is electrically connected to the first electrode of the load battery 601, the primary side of the optocoupler IC2 is excited, so that the secondary side of the optocoupler IC2 is turned on, thereby transmitting a low level to the delay voltage divider unit 732, limiting the delay voltage divider unit 732 from triggering the switch element Q13 to turn on. Thus, it prevents the forced starting module 73 from triggering the first switch control module 46 to enter the ready state when the first output Vout1 and the second output Vout2 are reversely connected to the load battery 601.

In some embodiments, as shown in FIG. 10, the second switch control module 48 includes a switch element Q1, a switch element Q2, a switch element Q4, a resistor R1, a resistor R4, a resistor R5, a resistor R9, a resistor R13, a resistor R43, a capacitor C1, a capacitor C2, a diode D1, and a diode D30.

Specifically, one current-passing end of the switch element Q1 is electrically connected to the first access detection module 47 to receive a connection confirmation signal. Resistor R1 and capacitor C1 are connected in series between a current-passing end of the switch element Q1 and the ground. One end of resistor R4 is electrically connected to the control end of the switch element Q1, and the other end is electrically connected to the connection node between resistor R1 and capacitor C1. The other current-passing end of the switch element Q1 is electrically connected to the anode of diode D1. Resistor R5 is electrically connected between the cathode of diode D1 and the control end of the switch element Q2. The anode of the capacitor C2 is electrically connected to the cathode of diode D1. The cathode of the capacitor C2 is grounded. Specifically, capacitor C2 is an electrolytic capacitor.

Specifically, resistor R43 and resistor R9 are connected in series between the reference voltage point and the control end of the switch element Q4. One current-passing end of the switch element Q2 is electrically connected to the connection node between resistor R43 and resistor R9, and the other current-passing end is grounded. Resistor R13 is electrically connected between the control end of the switch element Q4 and the ground. One of the current-passing ends of the switch element Q4 is electrically connected to the cathode of the diode D30, and the other current-passing end is grounded. The anode of the diode D30 is electrically connected to the time control terminal of the switch driving unit 411.

Further, one of the current-passing ends of the switch element Q4 is also electrically connected to the control end of the switch element Q13. More specifically, one of the current-passing ends of the switch element Q4 is also electrically connected to the cathode of the diode D36, and the anode of the diode D36 is electrically connected to the control end of the switch element Q13, so that after the time period defined by the enabled timing ends, the ON state of the switch element Q13 can be stopped, and the first switch control module 46 can exit the ready state.

Specifically, when one of the current-passing ends of the switch element Q1 receives a connection confirmation signal, where the signal form of the connection confirmation signal is the reference voltage. The reference voltage charges the capacitor C1 through the resistor R1. Since the control end of the switch element Q1 is initially clamped at a lower voltage by the capacitor C1, there is an electric potential difference between one of the current-passing ends of the switch element Q1 and the control end of the switch element Q1 in a short time, so that the switch element Q1 is turned on in a short time from the time when obtaining the power supply voltage. During the turned-on period of the switch element Q1, the switch element Q1 charges the capacitor C2 through the diode D1. In some embodiments, the duration of the ON state of the switch element Q1 is about 1s. In other embodiments, the duration of the ON state of the switch element Q1 can be adjusted according to actual needs, specifically by adjusting the resistance value of the resistor R1 or the capacitance value of the capacitor C1.

When the voltage of the capacitor C1 rises to the same voltage as the current-passing end of the switch element Q1, the switch element Q1 is turned off, and the electric charge of the capacitor C2 is released through the resistor R5 and the switch element Q2. When the voltage of the capacitor C2 is greater than the bias voltage of the control end of the switch element Q2, the switch element Q2 is turned on, and the control end of the switch element Q4 is clamped at a low level. The switch element Q4 remains disconnected. Limited by the resistor R5, the discharge process of the capacitor C2 needs to last for a period of time. During this period of time, the switch element Q4 remains disconnected, and the time control terminal of the switch driving unit 411 will not be clamped to a low level. When the voltage of the capacitor C2 drops to the point where the switch element Q2 cannot remain turned on, the switch element Q2 is disconnected. The reference voltage point is voltage divided by the resistor R43, the resistor R9 and the resistor R13, and a voltage is applied to the control end of the switch element Q4 to turn on the switch element Q4. After the switch element Q4 is turned on, the time control terminal of the switch driving unit 411 is clamped at a low level, and the switch driving unit 411 keeps the switch element K1 disconnected. Therefore, after the time period defined by the enabled timing ends, the second switch control module 48 can inhibit the triggering on the switch module 41 by the first switch control module 46, so that the switch module 41 remains in an OFF state between the first output Vout1 and the second output Vout2.

Specifically, the time during which the switch element Q2 remains ON state can be understood as the process of enabling the timing. After the switch element Q4 is turned on, the jump start circuit 400 maintains a standby state. In some embodiments, the duration of the time period defined by the enabled timing is about 60s. In other embodiments, the duration of the switch element Q2 being ON state can be adjusted according to actual needs, specifically by adjusting the resistance value of the resistor R5 or the capacitance value of the capacitor C2.

In some embodiments, as shown in FIG. 10, the second switch control module 48 further includes a switch element Q5, a resistor R10, and a resistor R14. The anode of the diode D30 is further electrically connected to one current-passing end of the switch element Q5, and the other current-passing end of the switch element Q5 is grounded. The resistor R10 is electrically connected between the other current-passing end of the switch element Q1 and the control end of the switch element Q5. The resistor R14 is electrically connected between the control end of the switch element Q5 and the ground. Specifically, during the ON period of the switch element Q1, the connection node between the resistor R10 and the resistor R14 has a voltage to turn on the switch element Q5, so that the time control terminal of the switch driving unit 411 is clamped at a low level, and the switch element K1 remains disconnected before enabling the timing.

In some embodiments, in combination with FIG. 12, the voltage detection module 44 includes a comparator U5, a fifth voltage divider branch and a sixth voltage divider branch. The fifth voltage divider branch is electrically connected between the positive electrode of the starting power supply 201 and the ground, and the middle node of the fifth voltage divider branch is electrically connected to the inverting input terminal of the comparator U5. The sixth voltage divider branch is electrically connected between the reference voltage point and the ground, and the middle node of the sixth voltage divider branch is electrically connected to the non-inverting input terminal of the comparator U5. The output terminal of the comparator U5 is configured to output a stop signal. Specifically, when the output voltage of the starting power supply 201 is lower than the third voltage threshold, the output terminal of the comparator U5 outputs a stop signal in the form of a high level. Specifically, the output terminal of the comparator U5 is configured to output a voltage abnormality warning signal. In some embodiments, one end of the fifth voltage divider branch is electrically connected to the positive electrode of the starting power supply 201 through a diode D28.

In some embodiments, the fifth voltage divider branch includes a resistor R22 and a resistor R30. The resistor R22 and the resistor R30 are connected in series between the positive electrode of the starting power supply 201 and the ground. The node between the resistor R22 and the resistor R30 is electrically connected to the inverting input terminal of the comparator U5. In some embodiments, the sixth voltage divider branch includes a resistor R18 and a resistor R33. The resistor R18 and the resistor R33 are connected in series between the reference voltage point and the ground. The node between the resistor R18 and the resistor R33 is electrically connected to the non-inverting input terminal of the comparator U5.

Specifically, the voltage detection module 44 further includes a diode D12, and the output terminal of the comparator U5 is electrically connected to the anode of the diode D12. The cathode of the diode D12 is configured to output a stop signal. Through the reverse isolation effect of the diode D12, the state of the output terminal of the comparator U5 can be prevented from being interfered by the stop signal output by other modules. In some embodiments, the voltage detection module 44 further includes a capacitor C10, which is electrically connected between the non-inverting input terminal of the comparator U5 and the ground, thereby playing a filtering role.

In some embodiments, in combination with FIG. 12, the voltage detection module 44 further includes a comparator U6, a seventh voltage divider branch, and an eighth voltage divider branch. The seventh voltage divider branch is configured to be electrically connected between the first output Vout1 and the ground, and the middle node of the seventh voltage divider branch is electrically connected to the non-inverting input terminal of the comparator U6. The eighth voltage divider branch is electrically connected between the reference voltage point and the ground, and the middle node of the eighth voltage divider branch is electrically connected to the inverting input terminal of the comparator U6. The output terminal of the comparator U6 is electrically connected to the non-inverting input terminal of the comparator U5. When the voltage of the first electrode of the load battery 601 is greater than the fifth voltage threshold, the output terminal of the comparator U6 inputs the reference voltage to the non-inverting input terminal of the comparator U5, so that the voltage of the non-inverting input terminal of the comparator U5 rises. Thus, in the case the output voltage of the starting power supply 201 remains unchanged and the voltage of the first electrode of the load battery 601 is too high, the output terminal of the comparator U5 outputs a stop signal and a voltage abnormality warning signal.

In some embodiments, the seventh voltage divider branch includes a resistor R19 and a resistor R31. The resistor R19 and the resistor R31 are connected in series between the first output Vout1 and the ground. The connection node between the resistor R19 and the resistor R31 is electrically connected to the non-inverting input terminal of the comparator U6. In some embodiments, the eighth voltage divider branch includes a resistor R25 and a resistor R34. The resistor R25 and the resistor R34 are connected in series between the reference voltage point and the ground. The connection node between the resistor R25 and the resistor R34 is electrically connected to the inverting input terminal of the comparator U6.

Specifically, in combination with FIG. 12, the voltage detection module 44 further includes a diode D13. The diode D13 is electrically connected between the output terminal of the comparator U6 and the non-inverting input terminal of the comparator U5. The unidirectional conduction direction of the diode D13 corresponds to the current direction from the output terminal of the comparator U6 to the non-inverting input terminal of the comparator U5, so that when the output terminal of the comparator U6 is at a low level, the voltage at the output terminal of the comparator U6 is prevented from affecting the voltage of the middle node of the sixth voltage divider branch.

In some embodiments, the voltage detection module 44 further includes an overvoltage detection branch. The overvoltage detection branch is electrically connected between the positive electrode of the starting power supply 201 and the node of the seventh voltage divider branch. When the output voltage of the starting power supply 201 is greater than the fourth voltage threshold, the overvoltage detection branch is turned on and transmits a voltage to the non-inverting input terminal of the comparator U6. The voltage is greater than the voltage of the inverting input terminal of the comparator U6. The output terminal of the comparator U6 inputs a reference voltage to the non-inverting input terminal of the comparator U5, so that the voltage of the non-inverting input terminal of the comparator U5 rises. Therefore, when the output voltage of the starting power supply 201 is too high, the output terminal of the comparator U5 outputs a stop signal and a voltage abnormality warming signal.

In some embodiments, in combination with FIG. 12, the overvoltage detection branch includes a voltage stabilizing diode ZD2, a diode D7, and a resistor R40. The voltage stabilizing diode ZD2, the diode D7, and the resistor R40 are connected in series between the positive electrode of the starting power supply 201 and the node of the seventh voltage divider branch. The unidirectional conduction direction of the voltage stabilizing diode ZD2 corresponds to the current direction from the node of the seventh voltage divider branch to the positive electrode of the starting power supply 201. The unidirectional conduction direction of the diode D7 corresponds to the current direction from the positive electrode of the starting power supply 201 to the node of the seventh voltage divider branch. Specifically, when the output voltage of the starting power supply 201 is greater than the fourth voltage threshold, the voltage stabilizing diode ZD2 reversely breaks down. The resistor R40 and the resistor R31 distribute in proportion the output voltage of the starting power supply 201 to the non-inverting input terminal of the comparator U6, so that the voltage of the non-inverting input terminal of the comparator U6 rises. Before the voltage stabilizing diode ZD2 is turned on, the diode D7 is configured to prevent the voltage at the non-inverting input terminal of the comparator U6 from interfering with the positive voltage of the starting power supply 201.

In some embodiments, as shown in FIG. 12, the voltage detection module 44 further includes a second feedback branch. The second feedback branch is electrically connected between the output terminal of the comparator U5 and the non-inverting input terminal of the comparator U5. When a high level appears at the output terminal of the comparator U5, the high level is transmitted to the non-inverting input terminal of the comparator U5 through the second feedback branch, thereby locking the output state of the comparator U5 to a high level and maintaining the output of the stop signal, which is in the form of a high level. In some embodiments, the second feedback branch includes a diode D5 and a resistor R20. The diode D5 and the resistor R20 are connected in series between the output terminal of the comparator U5 and the non-inverting input terminal of the comparator U5. The unidirectional conduction direction of the diode D5 corresponds to the current direction from the output terminal of the comparator U5 to the non-inverting input terminal of the comparator U5.

In some embodiments, in combination with FIG. 13, the temperature detection module 45 includes a comparator U3, a ninth voltage divider branch and a tenth voltage divider branch. The ninth voltage divider branch is electrically connected between the reference voltage point and the ground. The node of the ninth voltage divider branch is electrically connected to an input terminal of the comparator U3. The resistance value of a part of the ninth voltage divider branch is sensitive to temperature. The tenth voltage divider branch is electrically connected between the reference voltage point and the ground. The node of the tenth voltage divider branch is electrically connected to another input terminal of the comparator U3. The output terminal of the comparator U3 is configured to output a stop signal to the switch module 41. In some embodiments, the output terminal of the comparator U3 is further configured to output an over-temperature warning signal to the light indication module 43.

In some embodiments, in combination with FIG. 13, the ninth voltage divider branch includes a resistor R23 and a resistor NTC1. The resistor NTC1 is a negative temperature coefficient thermistor. The resistor R23 and the resistor NTC1 are connected in series between the reference voltage point and the ground. The connection node between the resistor R23 and the resistor NTC1 is electrically connected to the inverting input terminal of the comparator U3. In some other embodiments, the resistor NTC1 can be replaced with a positive temperature coefficient thermistor, and the connection node between the resistor R23 and the resistor NTC1 is electrically connected to the non-inverting input terminal of the comparator U3. In some embodiments, the temperature detection module 45 further includes a capacitor C15, which is electrically connected between the inverting input terminal of the comparator U3 and the ground, thereby playing a filtering role.

In some embodiments, in combination with FIG. 13, the tenth voltage divider branch includes a resistor R21 and a resistor R32. The resistor R21 and the resistor R32 are connected in series between the reference voltage point and the ground. The connection node between the resistor R21 and the resistor R32 is electrically connected to the non-inverting input terminal of the comparator U3.

In some embodiments, as shown in FIG. 13, the temperature detection module 45 further includes a third feedback branch. The third feedback branch is electrically connected between the output terminal of the comparator U3 and the non-inverting input terminal of the comparator U3. When a high level appears at the output terminal of the comparator U3, the high level is transmitted to the non-inverting input terminal of the comparator U3 through the third feedback branch, thereby locking the output state of the comparator U3 to a high level and maintaining the output of the stop signal. The stop signal is in the form of a high level. In some embodiments, the third feedback branch includes a diode D9 and a resistor R17. The diode D9 and the resistor R17 are connected in series between the output terminal of the comparator U3 and the non-inverting input terminal of the comparator U3. The unidirectional conduction direction of the diode D9 corresponds to the current direction from the output terminal of the comparator U3 to the non-inverting input terminal of the comparator U3.

In some embodiments, as shown in FIG. 13, the temperature detection module 45 further includes a diode D11, and the output terminal of the comparator U3 outputs a stop signal to the switch module 41 through the diode D11. The reverse isolation effect of the diode D11 can prevent the state of the output terminal of the comparator U3 from being interfered by the stop signal output by other modules. More specifically, the output terminal of the comparator U3 is electrically connected to the anode of the diode D11. The cathode of the diode D11 is electrically connected to the switch module 41.

In some embodiments, the output end of the first switch control module 46 is electrically connected to the time control terminal of the switch driving unit 411.

In some embodiments, as shown in FIG. 14*b*, the sound alarm module 42 includes an electroacoustic element BZ1, a switch element Q3, a resistor R6, and a resistor R8. One end of the electroacoustic element BZ1 is electrically connected to the reference voltage point. The other end of the electroacoustic element BZ1 is electrically connected to one current-passing end of the switch element Q3. The other current-passing end of the switch element Q3 is grounded. One end of the resistor R6 is configured to receive a stop signal, and the other end is electrically connected to the control end of the switch element Q3. The resistor R8 is electrically connected between one end of the resistor R6 and the ground.

Specifically, when the overload detection module 81, the voltage detection module 44, or the temperature detection module 45 outputs a stop signal, the switch element Q3 is turned on, so that there is an electric potential difference between the two ends of the electroacoustic element BZ1. The current flows through the electroacoustic element BZ1, causing the electroacoustic element BZ1 to emit an alarm warning sound. In some embodiments, the electroacoustic element BZ1 may be a buzzer or other device that can generate sound when powered on.

In some embodiments, the sound alarm module 42 further includes a diode D2. The cathode of the diode D2 is electrically connected to one end of the electroacoustic element BZ1, and the anode of the diode D2 is electrically connected to the other end of the electroacoustic element BZ1, so that the back electromotive force of the electroacoustic element BZ1 can be released through the diode D2.

In some embodiments, in combination with FIG. 14*a*, the light indication module 43 further includes a light-emitting diode D45 and a third current limiting branch. The light-emitting diode D45 and the third current limiting branch are connected in series between the positive electrode of the starting power supply 201 and the ground, and the unidirectional conduction direction of the light-emitting diode D45 corresponds to the direction from the positive electrode of the starting power supply 201 to the ground. Further, the positive electrode of the starting power supply 201 transmits a high level to the light-emitting diode D45 through the third current limiting branch, so that the light-emitting diode D45 is turned on and emits a standby indicator light to indicate that the jump start circuit 400 is electrically connected to the electrodes of the starting power supply 201.

In some embodiments, the third current limiting branch includes a resistor R57 and a resistor R58. The resistor R57 and the resistor R58 are connected in series between the positive electrode of the starting power source 201 and the anode of the light-emitting diode D45.

In some embodiments, in combination with FIG. 14*a*, the light indication module 43 includes a light-emitting diode D47 and a second current limiting branch. The light-emitting diode D47 and the second current limiting branch are connected in series between the output end of the overload detection module 81 and the ground. The unidirectional conduction direction of the light-emitting diode D47 corresponds to the current direction from the output end of the overload detection module 81 to the ground. Specifically, when the overload detection module 81 outputs an overload indication signal, the overload indication signal turns on the light-emitting diode D47 and generates an overload warning light. In some embodiments, the second current limiting branch is electrically connected between the output end of the overload detection module 81 and the anode of the light-emitting diode D47, and the cathode of the light-emitting diode D47 is grounded. In other embodiments, the second current limiting branch is electrically connected between the cathode of the light-emitting diode D47 and the ground, and the anode of the light-emitting diode D47 is electrically connected to the output end of the overload detection module 81. Exemplarily, the second current limiting branch includes a resistor R79. In one embodiment, the resistor R79 is electrically connected between the cathode of the light-emitting diode D47 and the ground, and the anode of the light-emitting diode D47 is electrically connected to the output end of the overload detection module 81.

In some embodiments, in combination with FIG. 14*a*, the light indication module 43 further includes a switch element Q22. One current-passing end of the switch element Q22 is electrically connected to the anode of the light-emitting diode D45 or the node of the third current limiting branch. The other current-passing end of the switch element Q22 is grounded, and the control end of the switch element Q22 is electrically connected to the anode of the light-emitting diode D47. Specifically, when the overload detection module 81 does not output an overload indication signal, the positive electrode of the starting power supply 201 transmits a high level to the light-emitting diode D45 through the third current limiting branch, so that the light-emitting diode D45 is turned on and emits a standby indicator light. When the overload detection module 81 outputs an overload indication signal, the high level of the overload indication signal turns on the switch element Q22. The anode of the light-emitting diode D45 is clamped at a low level, and no current passes through the light-emitting diode D45, so that the standby indicator light goes out.

In some embodiments, in combination with FIG. 14*a*, the light indication module 43 further includes a light-emitting diode D42, a light-emitting diode D43, and a light-emitting diode D44. The anodes of the light-emitting diode D42, the light-emitting diode D43, and the light-emitting diode D44 are electrically connected to the positive electrode of the starting power supply 201. The cathodes of the light-emitting diode D42, the light-emitting diode D43, and the light-emitting diode D44 are electrically connected to one end of the third current limiting branch. The other end of the third current limiting branch is electrically connected to the anode of the light-emitting diode D45. Specifically, when the anode of the light-emitting diode D42 is electrically connected to the positive electrode of the starting power supply 201, the light-emitting diode D42, the light-emitting diode D43, and the light-emitting diode D44 are turned on at the same time and jointly generate an ignition indicator light. The ignition indicator light is configured to indicate that the electrodes of the jump start circuit 400 and the electrodes of the starting power supply 201 have completed electrical connection.

In some embodiments, in combination with FIG. 14*a*, the light indication module 43 further includes a light-emitting diode D39 and a resistor R56. The light-emitting diode D39 and the resistor R56 are connected in series between the output end of the temperature detection module 45 and the ground. The unidirectional conduction direction of the light-emitting diode D39 corresponds to the direction from the output end of the temperature detection module 45 to the ground. When the voltage detection module 44 outputs an over-temperature warning signal, the light-emitting diode D39 is turned on and emits an over-temperature warning light.

In some embodiments, in combination with FIG. 14*a*, the light indication module 43 further includes a light-emitting diode D40. The light-emitting diode D40 and the resistor R56 are connected in series between the output end of the voltage detection module 44 and the ground. The unidirectional conduction direction of the light-emitting diode D40 corresponds to the direction from the output end of the voltage detection module 44 to the ground. When the voltage detection module 44 outputs a voltage abnormality warning signal, the light-emitting diode D40 is turned on and emits a voltage abnormality warning light.

In some embodiments, in combination with FIG. 11, the overload detection module 81 includes a second determining unit 811 and an output unit 812. The second determining unit 811 is configured to electrically connect to the electrodes of the starting power supply 201. The second determining unit 811 outputs a low-voltage identification signal when the voltage of the first output Vout1 is lower than the sixth voltage threshold. In some embodiments, the second determining unit 811 is configured to electrically connect to the first input terminal Vin1 and the second input terminal Vin2, and the second determining unit 811 outputs a low-voltage identification signal when the electric potential difference between the first input terminal Vin1 and the second input terminal Vin2 is lower than the sixth voltage threshold. For example, the overload detection module 81 is electrically connected to the positive electrode of the starting power supply 201 through the first input terminal Vin1, and the overload detection module 81 is electrically connected to the negative electrode of the starting power supply 201 through the second input terminal Vin2. After receiving the low-voltage identification signal, the output unit 812 maintains the output of the stop signal. Specifically, after the low-voltage identification signal appears, even if the low-voltage identification signal disappears because the voltage of the first electrode of the starting power supply 201 is restored to not lower than the sixth voltage threshold, the output unit 812 still maintains the output of the stop signal. The output unit 812 needs to be powered off and then powered on again before the output of the stop signal is canceled, thereby avoiding the gradual accumulation of damage to the starting power supply 201 or other electronic components due to repeated overload conditions.

In some embodiments, as shown in FIG. 11, the second determining unit 811 includes a comparator U1, an eleventh voltage divider branch and a twelfth voltage divider branch. One end of the eleventh voltage divider branch is configured to electrically connect the positive electrode of the starting power supply 201, and the node of the eleventh voltage divider branch is electrically connected to an input terminal of the comparator U1. One end of the twelfth voltage divider branch is configured to input the reference voltage, and the node of the twelfth voltage divider branch is electrically connected to the other input terminal of the comparator U1. The output terminal of the comparator U1 is electrically connected to the output unit 812 and is configured to transmit the low-voltage identification signal to the output unit 812.

Exemplarily, the output end of the voltage stabilizing module 49 is configured to input a reference voltage to one end of the twelfth voltage divider branch.

In some embodiments, the node of the eleventh voltage divider branch is electrically connected to the inverting input terminal of the comparator U1. The node of the twelfth voltage divider branch is electrically connected to the non-inverting input terminal of the comparator U1, and the signal form of the low-voltage identification signal is a high level. In some embodiments, the voltage division ratio of the twelfth voltage divider branch is set according to the magnitude relationship between the reference voltage and the sixth voltage threshold and the voltage division ratio of the eleventh voltage divider branch, so that the magnitude comparison result between the inverting input terminal voltage and the non-inverting input terminal voltage of the comparator U1 can be equivalent to the magnitude comparison result between the positive electrode voltage of the starting power supply 201 and the sixth voltage threshold. In one embodiment, when the voltage division ratio of the eleventh voltage divider branch is P1, the reference voltage is VB, and the sixth voltage threshold is VTH1, the voltage division ratio of the twelfth voltage divider branch is P2=(VTH1×P1)/VB.

In some embodiments, in combination with FIG. 11, the eleventh voltage divider branch includes a resistor R66 and a resistor R77. The resistor R66 and the resistor R77 are connected in sequence in series between the positive electrode of the starting power supply 201 and the ground. The node between the resistor R66 and the resistor R77 is electrically connected to an input terminal of the comparator UL. The voltage division ratio of the eleventh voltage divider branch can be understood as the ratio between the resistance value of the resistor R77 and the total resistance value of the eleventh voltage divider branch (the sum of the resistance values of the resistor R66 and the resistor R77). Specifically, the resistor R66 can be understood as an equivalent resistor after a plurality of resistors are connected in series or in parallel. The resistor R77 can also be understood as an equivalent resistor after a plurality of resistors are connected in series or in parallel.

In some embodiments, in combination with FIG. 11, the twelfth voltage divider branch includes a resistor R64 and a resistor R68. The resistor R64 and the resistor R68 are connected in sequence in series between the reference voltage point and the ground. The node between the resistor R64 and the resistor R68 is electrically connected to an input terminal of the comparator U1. The voltage division ratio of the twelfth voltage divider branch can be understood as the ratio between the resistance of resistor R68 and the total resistance value of the twelfth voltage divider branch (the sum of the resistance values of resistors R64 and R68). Specifically, resistor R64 can be understood as an equivalent resistor after a plurality of resistors connected in series or in parallel. Resistor R68 can also be understood as an equivalent resistor after a plurality of resistors connected in series or in parallel. Specifically, the reference voltage point is an electrical position where the voltage relative to the ground is a reference voltage.

Further, in combination with FIG. 11, the second determining unit 811 further includes a capacitor C11, which is electrically connected between the reference voltage point and the ground, thereby improving the stability of the reference voltage.

In some embodiments, in combination with FIG. 11, the output unit 812 includes a switch element Q21, a switch element Q20, a fourth current limiting branch, and a first feedback branch. The control end of the switch element Q21 is electrically connected to the output end of the second determining unit 811, one current-passing end of the switch element Q21 is electrically connected to the control end of the switch element Q20, and the other current-passing end of the switch element Q21 is grounded. One current-passing end of the switch element Q20 is configured to input a reference voltage, and the other current-passing end of the switch element Q20 is configured to output a stop signal to the switch module 41. The fourth current limiting branch is electrically connected between one current-passing end of the switch element Q20 and the control end of the switch element Q20. The first feedback branch is electrically connected between the other current-passing end of the switch element Q20 and the control end of the switch element Q21. Specifically, when the second determining unit 811 outputs a low-voltage identification signal to the control end of the switch element Q21, the switch element Q21 is turned on, and the control end of the switch element Q20 is in a low level state. The bias voltage between one current-passing end and the control end of the switch element Q20 turns on the switch element Q20, so that the other current-passing end of the switch element Q20 can output a stop signal. Specifically, the stop signal is in the form of a high level, and the voltage amplitude is equal to the reference voltage. Since the first feedback branch is electrically connected between the other current-passing end of the switch element Q20 and the control end of the switch element Q21, even after the low-voltage identification signal disappears, the other current-passing end of the switch element Q20 can transmit a high level to the control end of the switch element Q21 to maintain the switch element Q21 turned on, so the output unit 812 can maintain the output of the stop signal to prevent the starting power supply 201 or other electronic components from repeatedly entering an overload state. More specifically, the other current-passing end of the switch element Q20 outputs a stop signal to the stop control end of the switch driving unit 411.

In some embodiments, the other current-passing end of the switch element Q20 is further configured to output an overload indication signal to the light indication module 43. Specifically, the resistor R11 is electrically connected between the other current-passing end of the switch element Q20 and the switch element Q7. In some embodiments, when there are other modules that can output a stop signal, the output unit 812 further includes a diode D17. The anode of the diode D17 is electrically connected to the other current-passing end of the switch element Q20, and the cathode of the diode D17 is electrically connected to the switch module 41. Through the reverse isolation effect of the diode D17, the state of the switch element Q21 can be prevented from being interfered by the stop signal output by other modules.

In some embodiments, as shown in FIG. 11, the fourth current limiting branch includes a resistor R65. The resistor R65 is electrically connected between one current-passing end of the switch element Q20 and the control end of the switch element Q20.

In some embodiments, as shown in FIG. 11, the first feedback branch includes a diode D34 and a resistor R71 connected in series between the other current-passing end of the switch element Q20 and the control end of the switch element Q21. The unidirectional conduction direction of the diode D34 corresponds to the direction from the other current-passing end of the switch element Q20 to the control end of the switch element Q21, which prevents the voltage at the control end of the switch element Q21 from being directly transmitted to the outside as a stop signal.

In some embodiments, as shown in FIG. 11, the output unit 812 further includes an isolation delay branch. One end of the isolation delay branch is electrically connected to the output end of the second determining unit 811, the other end of the isolation delay branch is grounded, and the node of the isolation delay branch is electrically connected to the control end of the switch element Q21. Specifically, the isolation delay branch is configured to trigger the switch element Q21 to turn on after the duration of the low-voltage identification signal is greater than the predetermined time threshold, thereby avoiding the switch module 41 from being unable to stabilize in the ON state due to occasional and short-term overload. The isolation delay branch is also configured to make the control end of the switch element Q21 and the output end of the second determining unit 811 have voltage isolation, so as to avoid voltage clamping between the control end of the switch element Q21 and the output end of the second determining unit 811.

Specifically, the portion of the isolation delay branch between the output end of the second determining unit 811 and the control end of the switch element Q21 is resistive, and the portion of the isolation delay branch between the control end of the switch element Q21 and the ground is capacitive. When the output end of the second determining unit 811 outputs a high level low-voltage identification signal, the output end of the second determining unit 811 inputs electric charge to the capacitive portion through the resistive portion. The resistive portion plays a current limiting role, so that the voltage to the capacitive portion requires a certain rise time, so the switch element Q21 can be turned on after the low-voltage identification signal continues to appear for a period of time.

In some embodiments, as shown in FIG. 11, the isolation delay branch includes a resistor R74 and a capacitor C20. The resistor R74 is electrically connected between the control end of the switch element Q21 and the output end of the second determining unit 811. The capacitor C20 is electrically connected between the control end of the switch element Q21 and the ground. Specifically, the resistor R74 can be understood as an equivalent resistor after a plurality of resistors are connected in series or in parallel. The capacitor C20 can be understood as an equivalent capacitor after a plurality of capacitors are connected in series or in parallel. Specifically, by setting the resistance value of the resistor R74 and the capacitance value of the capacitor C20, the time required for the voltage of the capacitor C20 to rise to trigger the switch element Q21 to turn on can be controlled. That is, the delay time from the appearance of the low-voltage identification signal to the turn-on of the switch element Q21.

In some embodiments, as shown in FIG. 11, the output unit 812 further includes a resistor R76. The resistor R76 is electrically connected between the control end of the switch element Q21 and the ground. Specifically, when the low-voltage identification signal appears for a short time and then disappears, the resistor R76 can release the electric charge of the capacitor C20, which facilitates to accelerating the voltage drop speed of the capacitor C20, so that the delay can be restarted when the low-voltage identification signal appears again. Specifically, the resistor R76 is also configured to cooperate with the resistor R71 to form a voltage division effect, so that the first feedback branch acts on the control end of the switch element Q21 with a suitable voltage. Specifically, the resistor R76 is also configured to cooperate with the resistor R74 to form a voltage division effect, so that the output end of the second determining unit 811 acts on the control end of the switch element Q21 with a suitable voltage.

In some embodiments, in combination with FIG. 15, the voltage stabilizing module 49 includes a voltage stabilizing component U2, a resistor R2 and a capacitor C3. The resistor R2 is electrically connected between the input end of the voltage stabilizing component U2 and the positive electrode of the starting power supply 201. The capacitor C3 is electrically connected between the input end of the voltage stabilizing component U2 and the ground.

In some embodiments, the voltage stabilizing module 49 further includes a diode D28 and a capacitor C7. The anode of the diode D28 is electrically connected to the positive electrode of the starting power supply 201, and the cathode of the diode D28 is electrically connected to the resistor R2. The capacitor C7 is an electrolytic capacitor. The positive electrode of the capacitor C7 is electrically connected to the cathode of the diode D28, and the negative electrode of the capacitor C7 is grounded. In some embodiments, the positive electrode of the starting power supply 201 is electrically connected to the overload detection module 81, the switch module 41, the voltage detection module 44, or the light indication module 43 through the diode D28, so as to prevent the overload detection module 81, the switch module 41, the voltage detection module 44, or the light indication module 43 from being affected by the reverse voltage when the starting power supply 201 is reversely connected.

In some embodiments, the voltage stabilizing module 49 further includes a capacitor C4 and a capacitor C6. Capacitor C4 is electrically connected between the output end of the voltage stabilizing component U2 and the ground. Capacitor C6 is an electrolytic capacitor. The positive electrode of capacitor C6 is electrically connected to the output end of the voltage stabilizing component U2, and the negative electrode of capacitor C6 is grounded. Specifically, the ground end of the voltage stabilizing component U2 is grounded. The voltage stabilizing component U2 is a voltage stabilizer or an IC chip with a voltage stabilizing function. Specifically, the output end of the voltage stabilizing component U2 is configured to output a reference voltage.

The above embodiments are only descriptions of the preferred embodiments of the present disclosure, and are not intended to limit the scope of the present disclosure. Without departing from the design spirit of the present disclosure, various modifications and improvements made by the skilled persons in the art to the technical solution of the present disclosure should fall within the scope of protection determined by the claims of the present disclosure.

What is claimed is:

1. A jump start circuit, configured to operably connect a starting power supply to a load battery, comprising:

a first input terminal and a second input terminal, configured to electrically connect to a first electrode and a second electrode of the starting power supply, respectively;

a first output and a second output, configured to electrically connect to a first electrode and a second electrode of the load battery, respectively;

a switch module, electrically connected between the first input terminal and the first output, configured to operably connect the first input terminal to the first output;

a voltage fluctuation detection module, electrically connected to at least one of the first input terminal, the first output and branches between the first input terminal and the first output at a connection point, the voltage fluctuation detection module being configured to detect an electric potential fluctuation at the connection point, when the detected electric potential fluctuation reaches a fluctuation threshold, the voltage fluctuation detection module outputs a starting identification signal; under a triggering of the starting identification signal, the switch module remains in an ON state; and an access detection module, configured to output a connection confirmation signal when detecting that the first output and the second output are correctly connected to the first electrode and the second electrode of the load battery respectively; when the connection confirmation signal is received and the electric potential fluctuation is detected to reach the fluctuation threshold, the voltage fluctuation detection module outputs the starting identification signal;

wherein the access detection module comprises a first access detection module that is configured to detect a voltage of the first output and a second access detection module that is configured to output a detection voltage to the first output; when the voltage of the first output is greater than a first voltage threshold, the first access detection module outputs the connection confirmation signal; the detection voltage decreases as a resistance value between the first output and the second output decreases; and when the detection voltage is less than a second voltage threshold, at least one of the second access detection module and the first access detection module outputs the connection confirmation signal.

2. The jump start circuit of claim 1, further comprising a first switch control module; the first switch control module is electrically connected between the voltage fluctuation detection module and the switch module; the first switch control module controls a state of the switch module at least based on the starting identification signal.

3. The jump start circuit of claim 2, wherein when the connection confirmation signal is received but the starting identification signal is not received, the first switch control module alternately timings a power-on period and a detection period in time, and the first switch control module triggers the switch module to switch to the ON state during the power-on period and triggers the switch module to switch to an OFF state during the detection period; when the connection confirmation signal and the starting identification signal are both received, the first switch control module controls the switch module to remain in the ON state.

4. The jump start circuit of claim 2, wherein the first switch control module comprises a timing management chip U4; the timing management chip U4 is provided with a first level locking terminal, a second level locking terminal and an output terminal; the first level locking terminal and the second level locking terminal are electrically connected to the voltage fluctuation detection module to receive the starting identification signal; when the starting identification signal is received, the output terminal continuously outputs a valid level to the switch module, and the valid level is configured to trigger the switch module to switch to the ON state.

5. The jump start circuit of claim 1, wherein the voltage fluctuation detection module comprises a fluctuation detection unit and an access coupling unit electrically connected to the fluctuation detection unit; the fluctuation detection unit is electrically connected to at least one of the first input terminal and the first output; when the detected electric potential fluctuation reaches the fluctuation threshold, the fluctuation detection unit outputs an ignition detection signal to the access coupling unit; when the ignition detection signal and the connection confirmation signal are received, the access coupling unit outputs the starting identification signal.

6. The jump start circuit of claim 5, wherein the fluctuation detection unit comprises a switch element Q11, a diode D4, a capacitor C23 and a fluctuation current limiting branch; an anode of the diode D4 is electrically connected to the first input terminal or the first output; the capacitor C23 is electrically connected between an cathode of the diode D4 and a ground; the cathode of the diode D4 is further electrically connected to one current-passing end of the switch element Q11; one end of the fluctuation current limiting branch is electrically connected to a control end of the switch element Q11, and an other end is electrically connected to the first input terminal or the first output; an other current-passing end of the switch element Q11 is configured to output the ignition detection signal to the access coupling unit.

7. The jump start circuit of claim 5, wherein the access coupling unit comprises a switch element Q9, a switch element Q14, a switch element Q23, a resistor R7 and a first voltage divider branch; one current-passing end of the switch element Q9 is configured to receive the connection confirmation signal; the resistor R7 is electrically connected between the one current-passing end of the switch element Q9 and a control end of the switch element Q9; one current-passing end of the switch element Q14 is electrically connected to the control end of the switch element Q9, and an other current-passing end is grounded; a control end of the switch element Q14 is configured to receive the ignition detection signal; the first voltage divider branch is electrically connected between an other current-passing end of the switch element Q9 and the ground; a middle node of the first voltage divider branch is electrically connected to a control end of the switch element Q23; one current-passing end of the switch element Q23 is configured to output the starting identification signal, and an other current-passing end is grounded.

8. The jump start circuit of claim 1, further comprising a second switch control module electrically connected to the switch module; after receiving the connection confirmation signal, the second switch control module starts to enable timing;

under the triggering of the starting identification signal, the switch module remains in the ON state until the starting identification signal is eliminated or a time period defined by the enabled timing ends.

9. The jump start circuit of claim 1, wherein the voltage fluctuation detection module is electrically connected to the switch module; when receiving the starting identification signal, the switch module remains in the ON state.

10. The jump start circuit of claim 1, further comprising an overload detection module; wherein the overload detection module is configured to electrically connected to the first input terminal and the second input terminal; the overload detection module is configured to detect an electric potential difference between the first input terminal and the second input terminal, and to output a stop signal when the electric potential difference between the first input terminal and the second input terminal is lower than a sixth voltage threshold; the switch module switches to the OFF state when receiving the stop signal.

11. The jump start circuit of claim 10, wherein the overload detection module comprises a second determining unit and an output unit; the second determining unit is configured to electrically connect to the first input terminal and the second input terminal; the second determining unit outputs a low-voltage identification signal when the electric potential difference between the first input terminal and the second input terminal is lower than the sixth voltage threshold; the output unit maintains the output of the stop signal after receiving the low-voltage identification signal.

12. The jump start circuit of claim 11, wherein the output unit comprises a switch element Q21, a switch element Q20, a fourth current limiting branch, and a first feedback branch; wherein a control end of the switch element Q21 is electrically connected to an output end of the second determining unit, an current-passing end of the switch element Q21 is electrically connected to a control end of the switch element Q20, and an other current-passing end of the switch element Q21 is grounded; an current-passing end of the switch element Q20 is configured to input a reference voltage, and an other current-passing end of the switch element Q20 is configured to output the stop signal; the fourth current limiting branch is electrically connected between the current-passing end of the switch element Q20 and the control end of the switch element Q20; the first feedback branch is electrically connected between the other current-passing end of the switch element Q20 and the control end of the switch element Q21.

13. A jump starter, configured to operably connect a starting power supply to a load battery, comprising:

a housing, and a jump start circuit according to claim 1, wherein the jump start circuit is mounted in the housing, and the starting power supply is arranged outside the housing.

14. The jump starter of claim 13, wherein the first output and the second output are both constructed as clamps arranged outside the housing.

15. A jump start device, comprising:

a housing;

a starting power supply, accommodated in the housing; and a jump start circuit according to claim 1, wherein the jump start circuit is mounted in the housing.

16. A jump start circuit, configured to operably connect a starting power supply to a load battery, comprising:

a first input terminal and a second input terminal, configured to electrically connect to a first electrode and a second electrode of the starting power supply, respectively;

a first output and a second output, configured to electrically connect to a first electrode and a second electrode of the load battery, respectively;

a switch module, electrically connected between the first input terminal and the first output, configured to operably connect the first input terminal to the first output;

a voltage fluctuation detection module, electrically connected to at least one of the first input terminal, the first output and branches between the first input terminal and the first output at a connection point, the voltage fluctuation detection module being configured to detect an electric potential fluctuation at the connection point, when the detected electric potential fluctuation reaches a fluctuation threshold, the voltage fluctuation detection module outputs a starting identification signal; under a triggering of the starting identification signal, the switch module remains in an ON state; and an access detection module, configured to output a connection confirmation signal when detecting that the first output and the second output are correctly connected to the first electrode and the second electrode of the load battery respectively; when the connection confirmation signal is received and the electric potential fluctuation is detected to reach the fluctuation threshold, the voltage fluctuation detection module outputs the starting identification signal, wherein the voltage fluctuation detection module comprises a fluctuation detection unit and an access coupling unit electrically connected to the fluctuation detection unit; the fluctuation detection unit is electrically connected to at least one of the first input terminal and the first output; when the detected electric potential fluctuation reaches the fluctuation threshold, the fluctuation detection unit outputs an ignition detection signal to the access coupling unit; when the ignition detection signal and the connection confirmation signal are received, the access coupling unit outputs the starting identification signal; and wherein the fluctuation detection unit comprises a switch element Q11, a diode D4, a capacitor C23 and a fluctuation current limiting branch; an anode of the diode D4 is electrically connected to the first input terminal or the first output; the capacitor C23 is electrically connected between an cathode of the diode D4 and a ground; the cathode of the diode D4 is further electrically connected to one current-passing end of the switch element Q11; one end of the fluctuation current limiting branch is electrically connected to a control end of the switch element Q11, and an other end is electrically connected to the first input terminal or the first output; an other current-passing end of the switch element Q11 is configured to output the ignition detection signal to the access coupling unit.

17. The jump start circuit of claim 16, wherein the fluctuation current limiting branch comprises a resistor R87, one end of the resistor R87 is electrically connected to the control end of the switch element Q11, and an other end is electrically connected to the first input terminal or the first output; or wherein the fluctuation current limiting branch comprises a resistor R87 and a diode D6 connected in series, and an unidirectional conduction direction of the diode D6 corresponds to a current outflow direction from the control end of the switch element Q11.

18. The jump start circuit of claim 16, wherein the fluctuation detection unit further comprises a resistor R15, and the resistor R15 is electrically connected between the other current-passing end of the switch element Q11 and the access coupling unit.

19. A jump start device, comprising:

a housing;

a starting power supply, accommodated in the housing; and a jump start circuit according to claim 16.

20. A jump start circuit, configured to operably connect a starting power supply to a load battery, comprising:

a first input terminal and a second input terminal, configured to electrically connect to a first electrode and a second electrode of the starting power supply, respectively;

a first output and a second output, configured to electrically connect to a first electrode and a second electrode of the load battery, respectively;

a switch module, electrically connected between the first input terminal and the first output, configured to operably connect the first input terminal to the first output;

a voltage fluctuation detection module, electrically connected to at least one of the first input terminal, the first output and branches between the first input terminal and the first output at a connection point, the voltage fluctuation detection module being configured to detect an electric potential fluctuation at the connection point, when the detected electric potential fluctuation reaches a fluctuation threshold, the voltage fluctuation detection module outputs a starting identification signal; under a triggering of the starting identification signal, the switch module remains in an ON state; and an overload detection module; wherein the overload detection module is configured to electrically connected to the first input terminal and the second input terminal; the overload detection module is configured to detect an electric potential difference between the first input terminal and the second input terminal, and to output a stop signal when the electric potential difference between the first input terminal and the second input terminal is lower than a sixth voltage threshold; the switch module switches to the OFF state when receiving the stop signal, wherein the overload detection module comprises a second determining unit and an output unit; the second determining unit is configured to electrically connect to the first input terminal and the second input terminal; the second determining unit outputs a low-voltage identification signal when the electric potential difference between the first input terminal and the second input terminal is lower than the sixth voltage threshold; the output unit maintains the output of the stop signal after receiving the low-voltage identification signal; and wherein the output unit comprises a switch element Q21, a switch element Q20, a fourth current limiting branch, and a first feedback branch; wherein a control end of the switch element Q21 is electrically connected to an output end of the second determining unit, an current-passing end of the switch element Q21 is electrically connected to a control end of the switch element Q20, and an other current-passing end of the switch element Q21 is grounded; an current-passing end of the switch element Q20 is configured to input a reference voltage, and an other current-passing end of the switch element Q20 is configured to output the stop signal; the fourth current limiting branch is electrically connected between the current-passing end of the switch element Q20 and the control end of the switch element Q20; the first feedback branch is electrically connected between the other current-passing end of the switch element Q20 and the control end of the switch element Q21.

* * * * *